(12) United States Patent
Um et al.

(10) Patent No.: US 9,952,433 B2
(45) Date of Patent: Apr. 24, 2018

(54) WEARABLE DEVICE AND METHOD OF OUTPUTTING CONTENT THEREOF

(71) Applicant: LG ELECTRONICS INC., Seoul (KR)

(72) Inventors: Sangwon Um, Seoul (KR); Sunryang Kim, Seoul (KR); Jongpil Won, Seoul (KR); Jeongho Ahn, Seoul (KR); Hyungmin Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 861 days.

(21) Appl. No.: 14/475,023

(22) Filed: Sep. 2, 2014

(65) Prior Publication Data

US 2015/0067580 A1    Mar. 5, 2015

(30) Foreign Application Priority Data

Sep. 2, 2013    (KR) .......................... 10-2013-0105044

(51) Int. Cl.
*G06F 3/048*    (2013.01)
*G02B 27/01*    (2006.01)
(Continued)

(52) U.S. Cl.
CPC ........... *G02B 27/017* (2013.01); *G06F 3/013* (2013.01); *G06F 3/017* (2013.01); *G06F 3/048* (2013.01);
(Continued)

(58) Field of Classification Search
CPC . G06F 3/01; G06F 3/013; G06F 3/017; G06F 3/048; G06F 3/0481; G02B 27/01;
(Continued)

(56) References Cited

U.S. PATENT DOCUMENTS 7,766,517 B2 * 8/2010 Kerr ..................... G06F 1/1601
                                                    345/83
9,213,185 B1 * 12/2015 Starner ............... G02B 27/017
(Continued)

FOREIGN PATENT DOCUMENTS

| CN | 1922651 | 2/2007 |
| CN | 102906623 | 1/2013 |
| WO | 2013052855 | 4/2013 |

OTHER PUBLICATIONS

State Intellectual Property Office of the People's Republic of China Application Serial No. 201410443203.8, Office Action dated Dec. 28, 2016, 22 pages.
(Continued)

*Primary Examiner* — Xiomar L Bautista
(74) *Attorney, Agent, or Firm* — Lee, Hong, Degerman, Kang & Waimey

(57) ABSTRACT

The present disclosure discloses a wearable device and a method of outputting content thereof. According to one embodiment, the wearable device for outputting the content according to the present invention includes a sensor, a display, and a processor configured to: determine an output mode of the wearable device based on tracking information detected by the sensor, and cause the display to display content in a playback window of a screen, wherein: the playback window corresponds to an entire portion of the display when the output mode is an active mode, and the playback window corresponds to a portion of the display when the output mode is an inactive mode, wherein the portion of the display is less than the entire portion of the display.

16 Claims, 21 Drawing Sheets

(51) Int. Cl.
*G06F 3/01* (2006.01)
*G06F 3/0481* (2013.01)

(52) U.S. Cl.
CPC ...... *G06F 3/0481* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC .............. G02B 27/017; G02B 27/0172; G02B 27/0179; G02B 2027/0178; A63F 13/00
See application file for complete search history.

(56) References Cited

U.S. PATENT DOCUMENTS

| | | |
|---|---|---|
| 2009/0040233 A1 | 2/2009 | Yamamoto |
| 2009/0066722 A1* | 3/2009 | Kriger .................... G06Q 30/02 345/619 |
| 2010/0199389 A1* | 8/2010 | Butler ................. C12N 15/8213 800/298 |
| 2011/0213664 A1 | 9/2011 | Osterhout et al. |
| 2012/0038571 A1* | 2/2012 | Susani .................. G06F 3/0416 345/173 |
| 2012/0302289 A1 | 11/2012 | Kang |
| 2013/0128364 A1 | 5/2013 | Wheeler et al. |
| 2014/0364212 A1* | 12/2014 | Osman .................. A63F 13/213 463/31 |
| 2015/0092107 A1* | 4/2015 | Shao ................. H04N 21/41407 348/561 |

OTHER PUBLICATIONS

European Patent Office Application Serial No. 14182530.7, Search Report dated Dec. 4, 2014, 9 pages.
European Patent Office Application No. 14182530.7, Office Action dated Oct. 16, 2017, 12 pages.

* cited by examiner

| | GPS | Gyro | Accelerometer | Capturing pupil |
|---|---|---|---|---|
| Using display | ≒ 0 | « Threshold1 | ≒ 0 | size is fixed, no movement |
| Moving | « Threshold2 | ≠ 0 | « Threshold3 | size is changed, little movement |
| Using display while moving in vehicle | Threshold2 « | ≠ 0 | Threshold3 « | size is fixed, no movement |
| Driving | Threshold2 « | ≠ 0 | Threshold3 « | size is changed, little movement |

FIG. 16
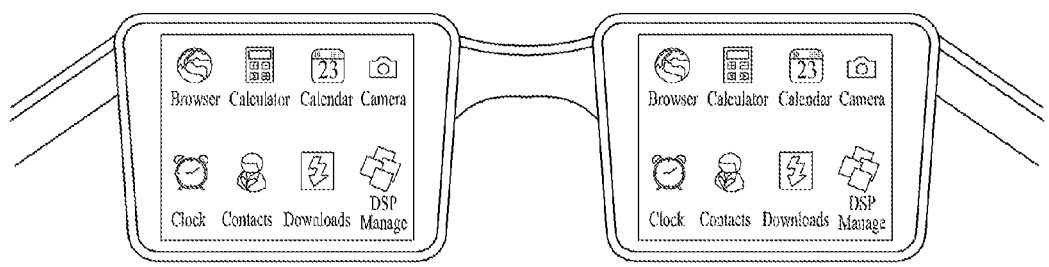
(a)
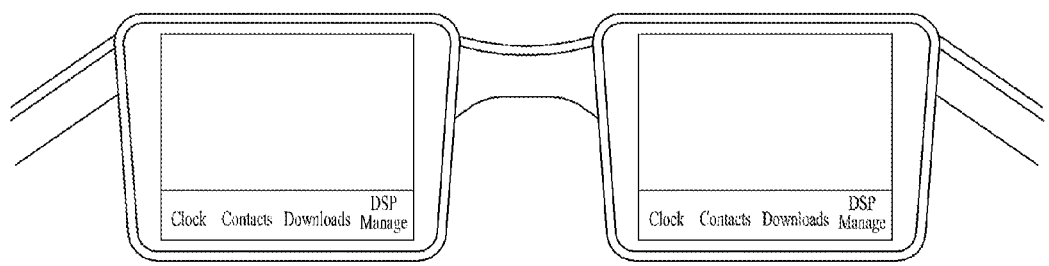
(b)

FIG. 21
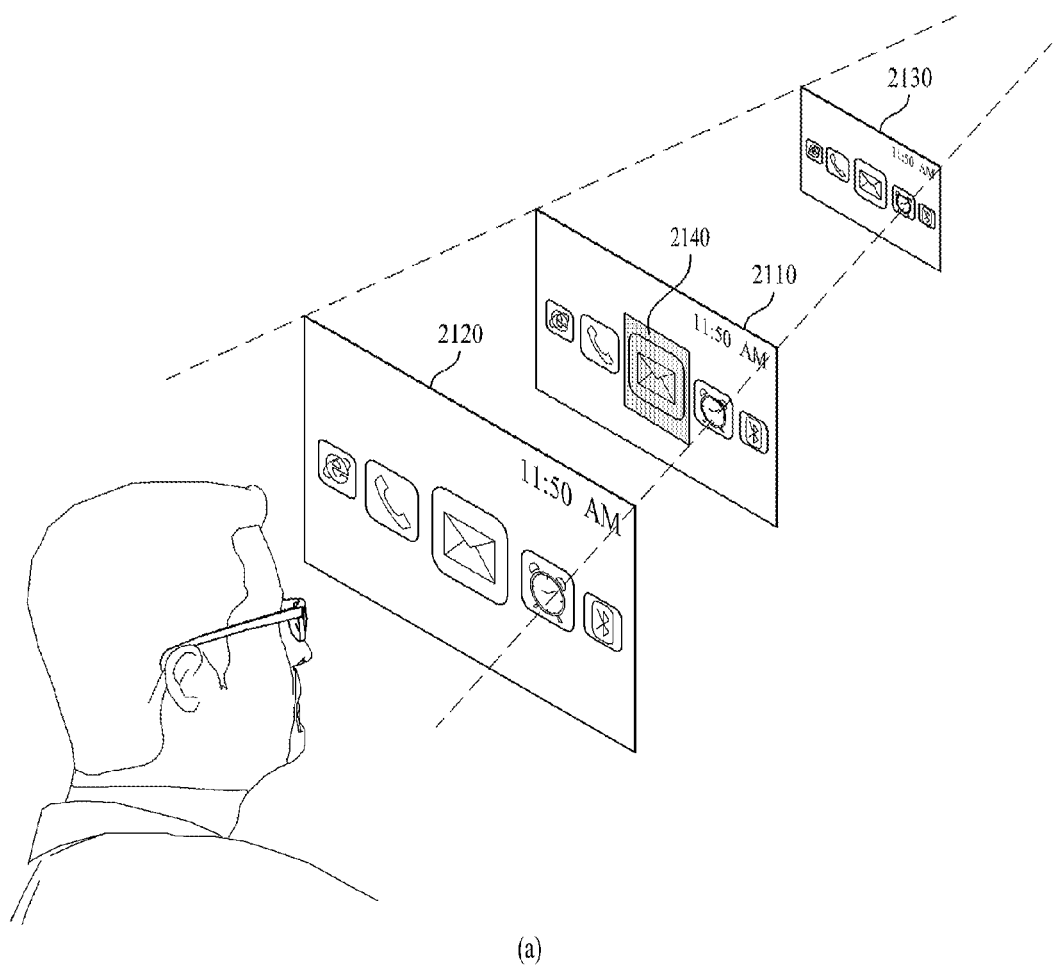
(a)
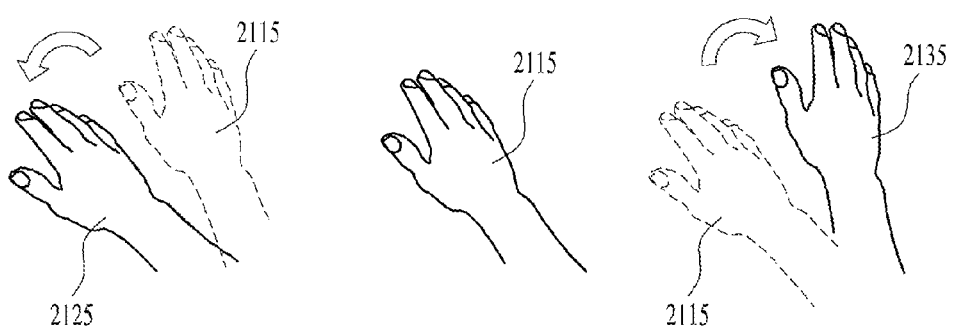
(b)

FIG. 23
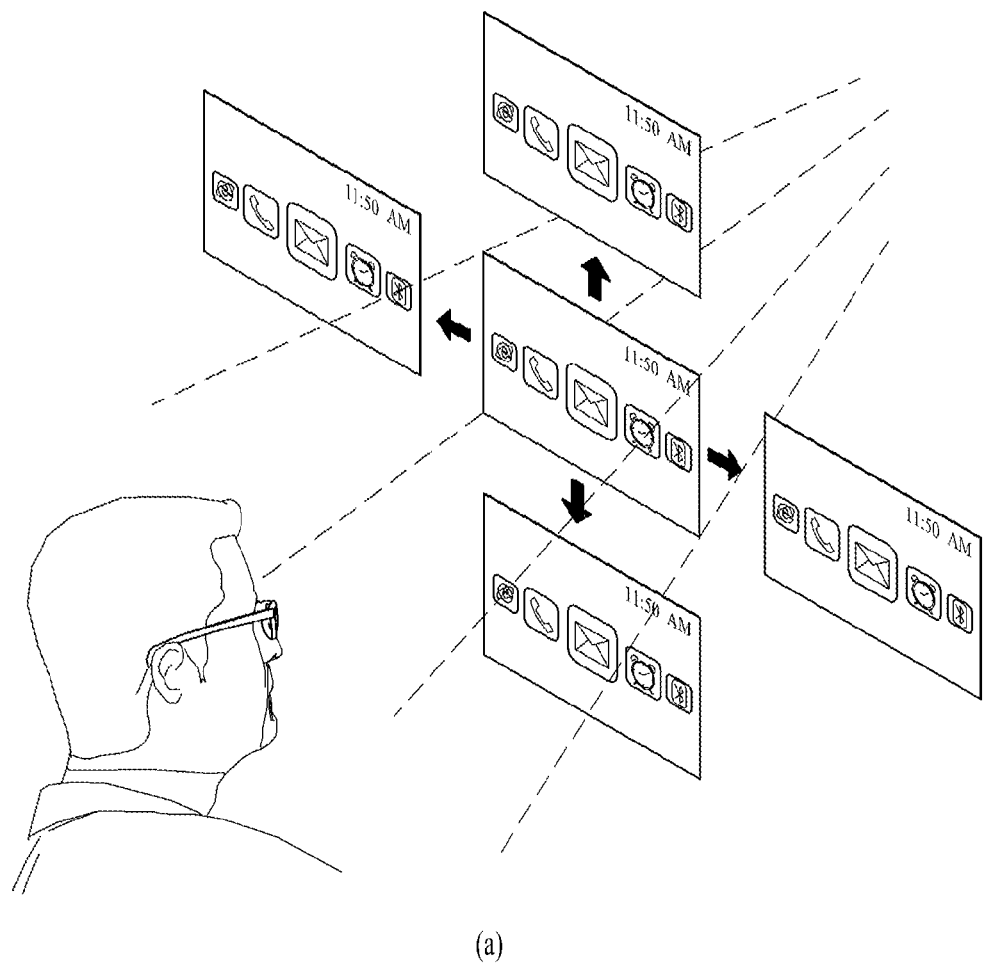
(a)
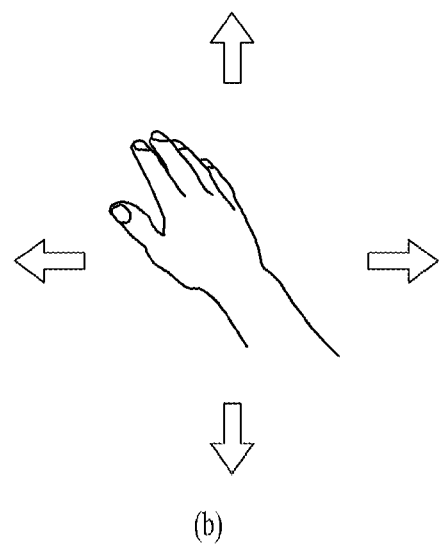
(b)

FIG. 28
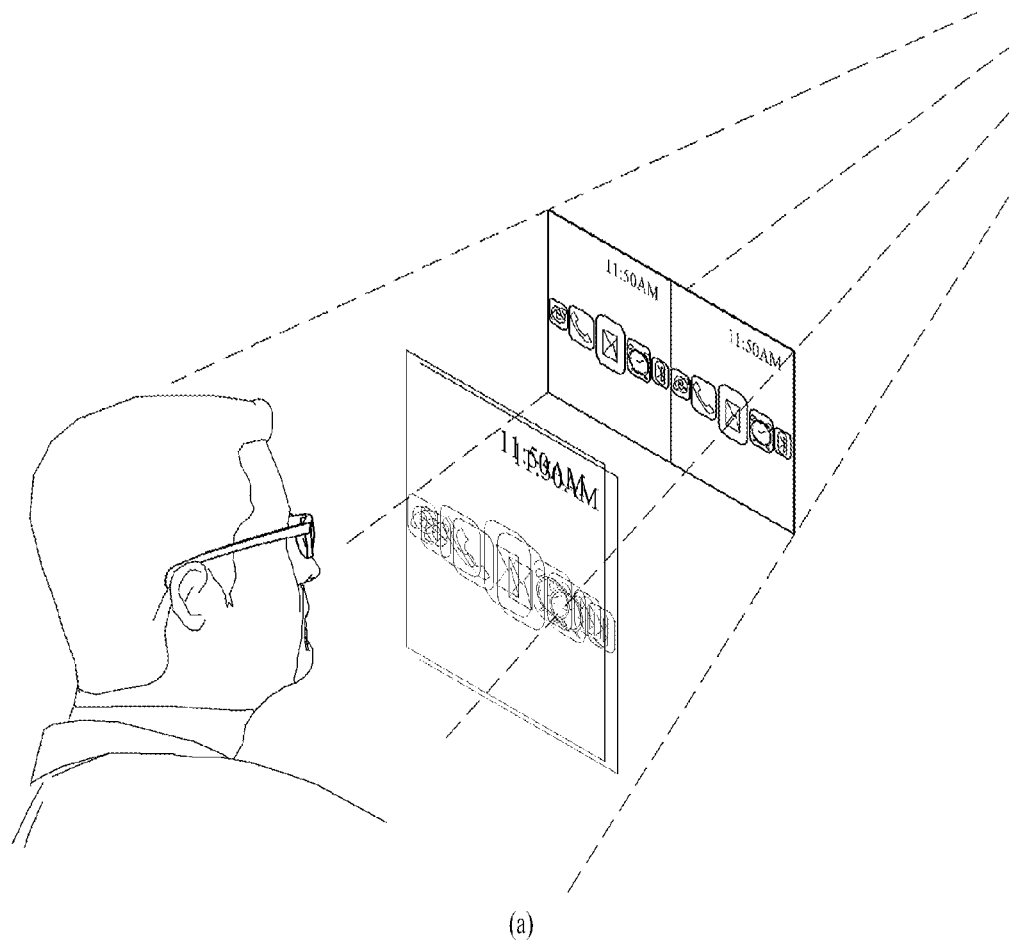
(a)
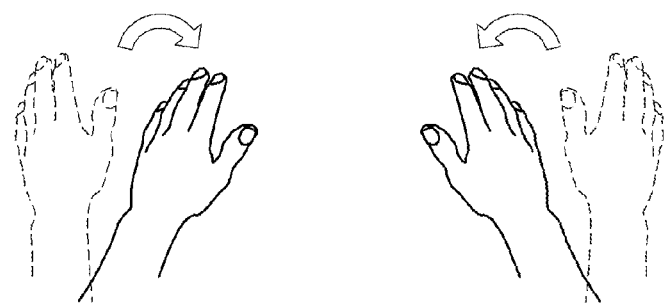
(b)

WEARABLE DEVICE AND METHOD OF OUTPUTTING CONTENT THEREOF

Pursuant to 35 U.S.C. § 119(a), this application claims the benefit of earlier filing date and right of priority to Korean Patent Application No. 10-2013-0105044, filed on Sep. 2, 2013, the contents of which are hereby incorporated by reference herein in its entirety.

BACKGROUND OF THE INVENTION

Field of the Invention

The present invention relates to a wearable device, and more particularly, to a method of outputting content, a user interface, and the like based on each of an action of a user, a status of the user, circumstance (or environment) of the wearable device, an attribute of the content, or combination thereof on the wearable device.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

A legacy display device is provided by such a fixed form as a TV in a prescribed location. Yet, as a recent mobile device changes its purpose to a smart device more than a simple purpose such as transmitting and reception of a call, a text message, or the like, interest in the display device is increasing.

For instance, schemes to more conveniently use a display device compared to a legacy display device have begun to study. As an example, such a wearable device as a HMD (head mounted display) or a smart watch is introducing nowadays.

In the foregoing description, the HMD is implemented by such a form of being worn on a head of a user as glasses and the smart watch is implemented by such a form of being worn on a wrist of a user as a watch. The HMD or the smart watch indicates a device capable of outputting a video without using the aforementioned TV or a separate display device. This becomes enabled as various wearable computers are developed according to a trend of lightening and miniaturization of a digital device. Meanwhile, the wearable device can provide a function of a legacy mobile device, various experiences and conveniences as well as a simple display function to a user in a manner of being combined with an augmented reality technology, an N screen technology, and the like.

Basically, the wearable device is implemented by a form of being worn on a body of a user. Unlike a legacy display device, the wearable device can be used in more various environments. Yet, a currently developed wearable device is only focusing on providing content via the wearable device. Moreover, the wearable device is implemented in a manner of not being matched with an action of a user, a status of the user, a circumstance of the wearable device, an attribute of content. Hence, the user using the wearable device may have a safety problem and inconvenience.

SUMMARY OF THE INVENTION

Accordingly, the present invention is directed to an apparatus and method thereof that substantially obviate one or more problems due to limitations and disadvantages of the related art. One object of the present invention is to provide an adaptive wearable device providing content and a user interface and a method of controlling therefor based on a user action, a status, an attribute of the content and the like.

Another object of the present invention is to improve user safety, product satisfaction and the like by providing the adaptive wearable device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In order to achieve the aforementioned objects, the present disclosure discloses a wearable device and a method of outputting content thereof.

In this case, according to one embodiment of the present invention, a method of outputting content in a wearable device includes determining an output mode of the wearable device based on tracking information detected via a sensor; and displaying the content in a playback window of a screen according to the determined output mode, wherein: the playback window corresponds to an entire portion of the screen when the output mode is an active mode; and the playback window corresponds to a portion of the screen when the output mode is an inactive mode, wherein the portion of the screen is less than the entire portion of the screen.

According to one embodiment of the present invention, a wearable device for outputting content includes a sensor, a display, and a processor configured to: determine an output mode of the wearable device based on tracking information detected by the sensor, and cause the display to display content in a playback window of a screen, wherein: the playback window corresponds to an entire portion of the display when the output mode is an active mode, and the playback window corresponds to a portion of the display when the output mode is an inactive mode, wherein the portion of the display is less than the entire portion of the display.

Accordingly, the present disclosure provides the following effects or advantages.

First of all, according to the present invention, it is able to provide an adaptive wearable device based on various factor(s) of a user instead of just outputting an image according to a request of the user.

Secondly, it is able to maintain a competitive price of a product in a manner of implementing an adaptive wearable device in terms of software while minimizing addition, change, or the like of a complex hardware.

Thirdly, it is able to improve product satisfaction of a user in a manner of playing content according to user safety or a status or performing a function via an adaptive wearable device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 15 and FIG. 16 illustrate diagrams for explaining an example of a method of providing a user interface according to a status of a user wearing a wearable device;

DETAILED DESCRIPTION OF THE INVENTION

Figure 1:
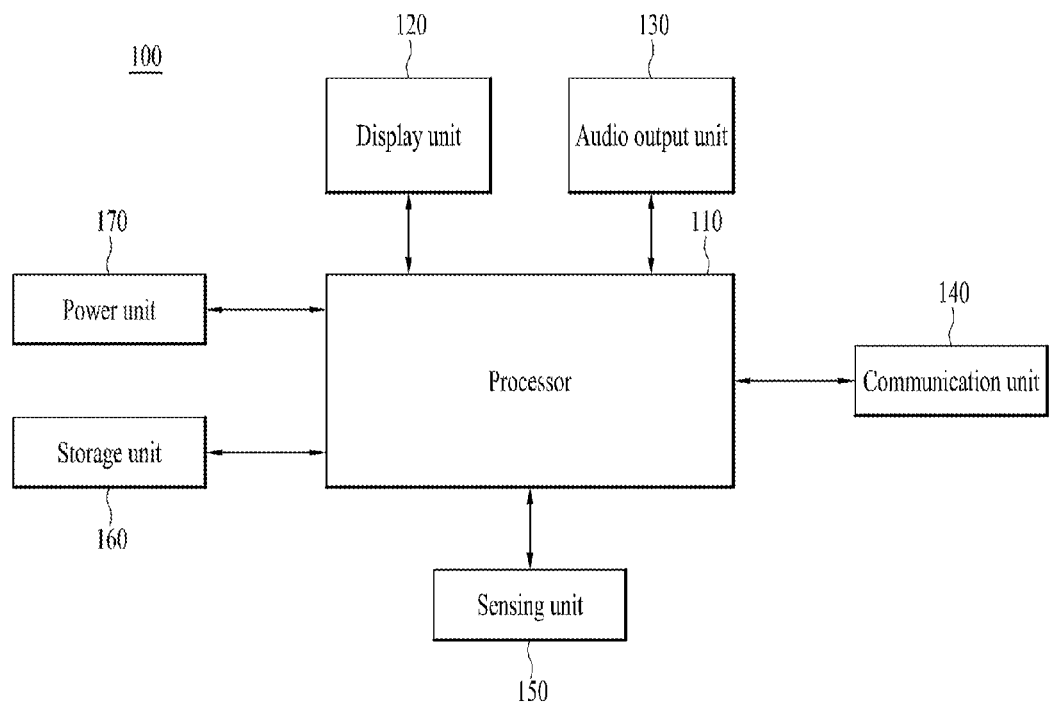
FIG. 1 illustrates a block diagram of a wearable device.

Although terminologies used in the present disclosure are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the disclosure. Therefore, terminologies used in the present disclosure need to be construed based on the substantial meanings of the corresponding terminologies and the overall matters disclosed in the present disclosure rather than construed as simple names of the terminologies.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as a mobile phone, an user equipment, a smart phone, a mobile computer, a digital broadcast terminal, a personal digital assistant (PDA), a portable multimedia player (PMP) and a navigator.

In the present disclosure, a wearable device or a wearable display device (hereinafter, 'wearable device') is described. In particular, the present disclosure describes in detail a wearable device providing content, a user interface, and the like based on each of an action of a user, a status of the user (including an environment of the wearable device), a content attribute or the like or combination thereof.

A wearable device described in the following present disclosure includes all kinds of display devices outputting prescribed content, information, and the like in a manner of attaching/detaching or installing a display device to/from a body of a user. As a sort of the wearable device, a glasses-type device such as a Google glass, a smart watch, a HMD (head mounted display), a lens, and the like have been introduced. Besides, the wearable device can include various devices capable of providing a display in a manner of being worn on a user such as an EMD (eye mounted display), an eyeglass, an eyepiece, an eye wear, a HWD (head worn display), and the like. For clarity and understanding of the present invention, a glasses-type wearable device is described and explained as an example of the wearable device. Yet, it is apparent that a technical idea of the present invention can be identically or similarly applied to a wearable device implemented by a different form.

And, a term 'user action' described in the present disclosure corresponds to a concept including a gesture of a user wearing a wearable device, an eye tracking, a user selection or an input performed via a touch pad, a touch screen, a button, and the like implemented in the wearable device, and the like.

And, a term 'user status' described in the present disclosure includes all status or states frequently experienced by a user wearing a wearable device in everyday life such as sight information of the user wearing the wearable device, surrounding status or illumination of a location to which the user belongs, in case that the user is in the course of exercising, moving, stopping, or in case that the user has removed the wearable device from the user, an emergency status in which the user faces, transmission and reception of a call, a text message, an urgent message, and the like while watching content.

Meanwhile, the term 'content attribute' described in the present disclosure means whether content corresponds to a text, an audio, a video, or an image. Regarding this, the content described in the present disclosure corresponds to a concept including an audio, a video, an image, a text, and the like. Although it is not specifically indicated, the content may correspond to at least one selected from the group consisting of an audio, a video, an image, a text in a corresponding part.

As mentioned in the foregoing description, the present disclosure intends to provide a method for a user attaching/detaching a wearable device to intuitively, more easily and conveniently control the wearable device based on each of the aforementioned factors and intends to provide a user interface (UI) necessary to perform the method.

In the following description, the technical idea of the present invention is explained in detail with reference to attached drawing(s).

According to one embodiment of the present invention, a wearable device for outputting content includes a processor configured to control an operation of the wearable device, a sensing unit configured to obtain first sensing information, an output unit configured to output the content to a screen according to a command of the processor, and a communication unit configured to transmit and receive data according to the command of the processor, wherein the processor configured to: determine an output mode from any one of an active mode and a non-active mode according to a state of a user based on the first sensing information obtained by the sensing unit, control a screen for outputting content to be outputted according to the determined output mode, control the content to be outputted in a whole screen if the output mode corresponds to the non-active mode, and control the content to be outputted in a part of the whole screen if the output mode corresponds to the active mode.

The content corresponds to one of pre-stored video data, image data, text data, map data, application data, and message data which is received from an external device. The sensing unit is configured to obtain the sensing information by at least one of a proximity sensor, a camera sensor, an audio sensor, an eye tracking sensor, a motion sensor, and an illumination sensor. The sensing unit is configured to periodically obtain the sensing information or configured to collect the sensing information in case that a movement of the user is detected.

And, the processor is configured to perform at least one of calculating an amount of incident light using the illumination sensor and obtaining location information of incident light source using an angle of reflection. The processor is configured to control at least one of a warning sound and a warning message to be generated and outputted based on at least one of the calculated amount of incident light and the obtained location information of the light source. Also, the processor is configured to control at least one step of changing configuration of the screen according to the determined output mode based on the at least one of the calculated amount of incident light and the obtained location information of the light source and changing a color of content included in the screen based on the at least one of the calculated amount of incident light and the obtained location information of the light source. The processor is configured to control a user action to be detected via the sensor unit, control second sensing information on the detected user action to be obtained, and control an image to be focused on a position of the screen to be moved based on the obtained second sensing information on the user action. The processor is configured to control sight information of the user to be obtained via the sensing unit, and control the screen to be outputted to make an image to be focused on a position different from a predetermined position based on the obtained sight information of the user.

FIG. 1 illustrates a block diagram of a wearable device.

Referring to FIG. 1, a wearable device 100 can include a processor 110, a display unit 120, an audio output unit 130, a communication unit 140, a sensing unit 150, a storage unit 160 and a power unit 170. Here, either the display unit 120 or the audio output unit 130 and a combination are called as an output unit.

Figure 3:
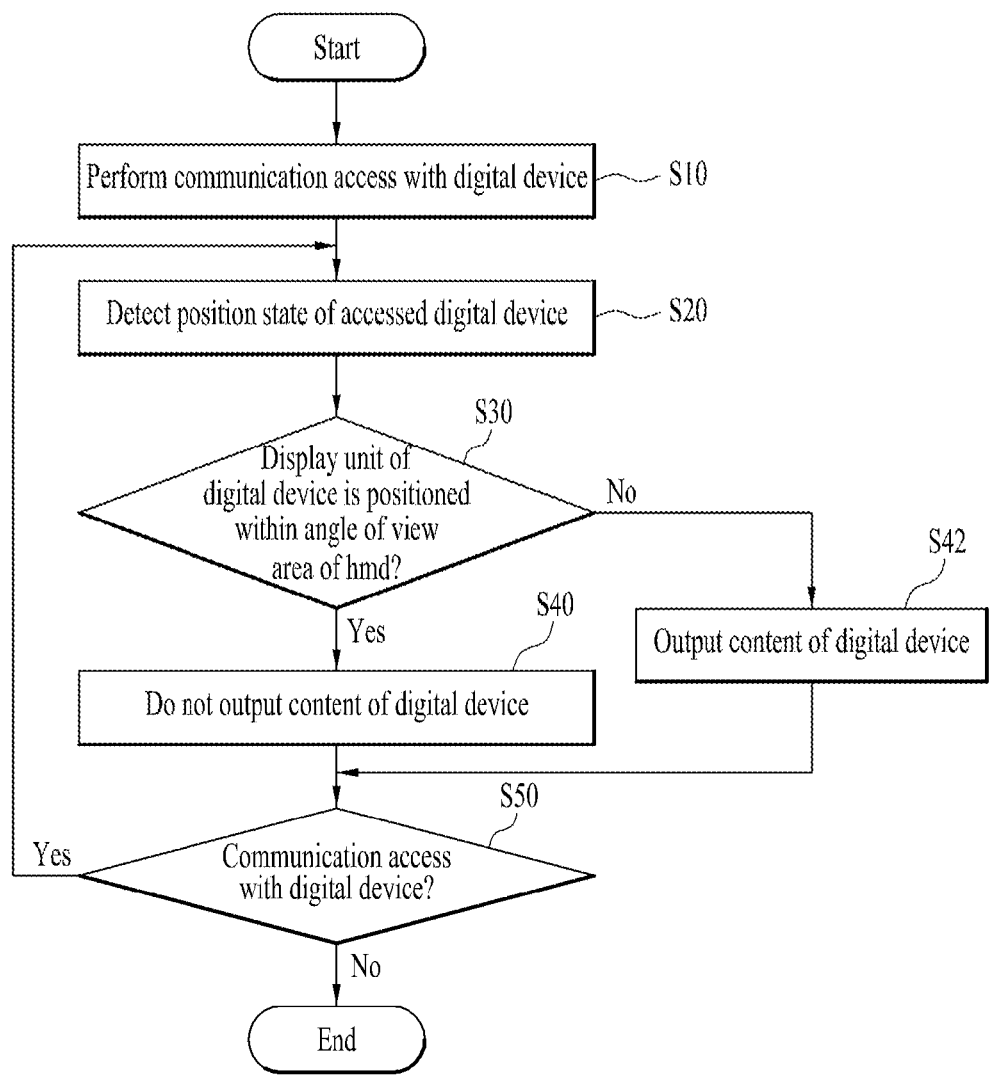
FIG. 3 illustrates a flowchart of a method of outputting content using a wearable device.

The display unit outputs content and/or a user interface in a display screen. And, as depicted in FIG. 3, the display unit 120 can transmit and receive data with an external device (e.g., a digital device) via the communication unit 140 in a manner of being synchronized with the external device. For instance, the display unit 120 can output content of a synchronized digital device in a manner of receiving the content in real time or non-real time.

The audio output unit 130 outputs an audio data for the content played via the processor 110. Meanwhile, the audio output unit 130 corresponds to such an audio output means implemented in the wearable device as a speaker, an earphone, and the like and may be implemented by a form of a jack configured to connect with the speaker, the earphone, and the like or a form of an interface. Besides, the audio output unit may receive an audio data from an external device and may be then able to output the audio data after the audio data is processed by the processor 110.

The communication unit 140 transmits and receives data with an external device or an external communication network in a manner of performing a communication via various communication protocols. Meanwhile, the communication protocol can include all other available wired/wireless communication protocols as well as LTE (long term evolution), LTE-A (LTE-Advanced), Wi-Fi, Bluetooth, and the like. Hence, the communication unit 140 can include at least one communication processing means to support various wired/wireless communication protocols. Or, the communication processing means may be included in the processor 110. Meanwhile, the processor 110 or the communication unit 140 searches for an external device capable of being connected to the processor or the communication unit via a network, performs a pairing with a currently available external device among the searched external devices, and may be then able to transceive data with the currently available external device. Meanwhile, the processor 110 or the communication unit 140 may include at least one antenna. The antenna can be used to detect location information of an external device paired with the wearable device 100. For instance, the wearable device 100 can detect or determine whether a display unit of the external device is positioned within an angle of view area of the wearable device 100 based on time difference of a signal transceived with the external device, phase difference, and the like via the antenna.

Figure 2:
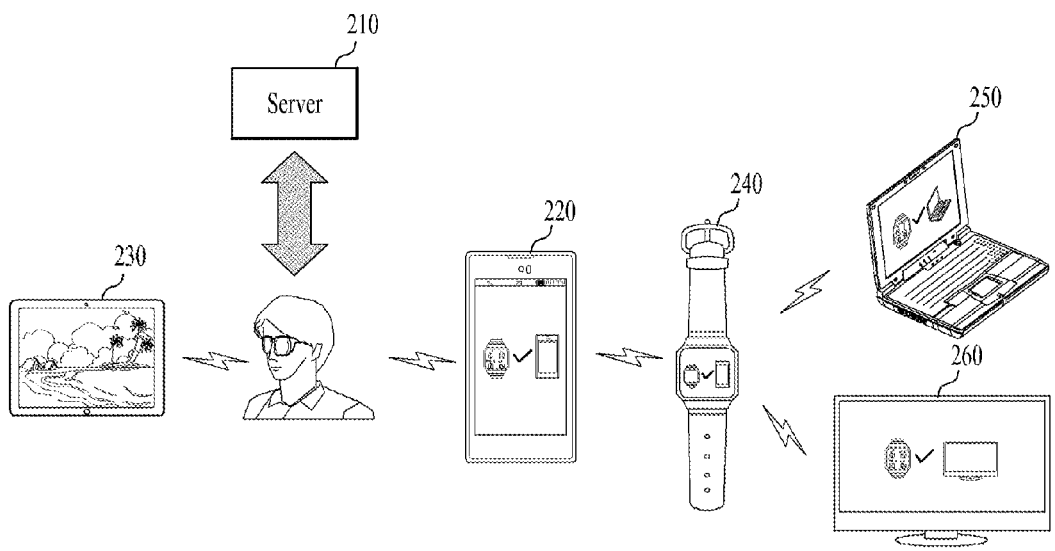
FIG. 2 illustrates a diagram for a digital device(s) capable of being synchronized with a wearable device.

The sensing unit 150 delivers a user action, an input, a gesture, and a status, a state, or environment recognized by the wearable device to the processor 110 using at least one sensor installed in the wearable device 100. The sensing unit 150 includes a plurality of sensing means. As depicted in FIG. 2, the sensing unit 150 may include at least one selected from the group consisting of a gravity sensor, a terrestrial magnetism sensor, a motion sensor, a gyro sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a lightning or illumination sensor. The sensing unit 150 senses such an action as various gestures of a user, an input, environment of the user, and the like using the aforementioned sensing means and may deliver data on the sensed result to the processor 110 to make the processor operate according to the sensed result. Meanwhile, for instance, although it may be assumed that the aforementioned sensing means is directly installed in the wearable device 100, other sensing means, which is not directly installed in the wearable device 100, can receive sensing information in a manner of communicating with an external sensing means. For instance, the sensing unit 150 may receive data, which is sensed by a user wearing the wearable device 100 using a sensor of a smart watch put on a wrist of the user. Or, the sensing unit 150 may receive sensing information from a sensor within a digital device made by a form of a chip transplanted or planted to a body of a user. Moreover, the processor 110 collects sensing information from each sensor and may use each of the sensing information, respectively or may use the sensing information in a manner of combining the sensing information with each other. The sensing unit 150 may include an imaging sensor (not depicted) or a camera sensor. The imaging sensor detects an image positioned within a predetermined angle of view area of the wearable device 100 and may be then able to provide the image to the processor 110. The processor 110 can determine whether there exist a digital device (or a display unit of the corresponding digital device) synchronized with the wearable device 100 within the angle of view area of the wearable device 100 based on the image detected by the imaging sensor.

The storage unit 160 can store such various data as a video, an audio, a picture, a moving clip, an application, and the like. In this case, the storage unit 160 includes a flash memory, a RAM (random access memory), an SSD (solid state driver), a HDD (hard disc drive), and the like. The storage unit 160 can temporarily store data received from an external device via the communication unit 140. In this case, the storage unit 160 can be used as a purpose of buffering the content received from the external device to output the content in the wearable device 100. Meanwhile, the storage unit 160 or a memory in the present disclosure mainly indicates a form installed in the wearable device 100 or a form arranged inside of the wearable device. Yet, in some cases, this sort of storing media concept may indicate an external storing media connected via an interface. For instance, although it is not depicted, the external storing media may include such a mobile device as a notebook, a smartphone, and a tablet PC, a BD (Blu-ray disc) player, a cloud server, an internet server (IP server), and the like.

The power unit 170 is a power source connected to an internal battery of the wearable device 100 or an external power supply and supplies power to the wearable device 100. The power unit 170 may include a wireless power interface related to a wireless power supply recently developing as well as a wired jack or an interface configured to receive external electrical power.

The processor 110 plays a role of a controller for generalizing an overall control process of the wearable device as well as an overall management and processing of the wearable device. Meanwhile, although it is not depicted, the processor 110 may include one or more elements to perform encoding, decoding and the like in relation to processing of application data, audio data, video data, image data, text data, sensed data, and the like. Besides, the processor 110 may further include one or more elements to process a CAS (conditional access system), a DRM (digital rights management), and the like.

The wearable device 100 depicted in FIG. 1 is a block diagram according to one embodiment. Each block can be modularized if necessary and vice versa. And, the wearable device 100 depicted in FIG. 1 can be implemented by a single chip or a plurality of chips according to a design of the device.

FIG. 2 illustrates a diagram for a digital device capable of being synchronized with a wearable device 200.

The wearable device 200 can transmit and receive data with digital device(s) or a server positioned at a short or a long distance from the wearable device via wired/wireless network.

Referring to FIG. 2, the wearable device 200 is connected with digital device(s) via a wired/wireless network and may be then able to transmit and receive data with the digital device(s). In this case, the digital device can include such a mobile device as smartphone 220, a tablet PC 230, a smart watch 240, a notebook 250 and such a fixed device as a DTV (digital television receiver) 260 and a PC (not depicted).

Meanwhile, the wearable device 200 is connected with a single digital device only and may be then able to transmit and receive data with the digital device. Or, the wearable device 200 can be connected with a plurality of digital devices at the same time and may be then able to transmit and receive data with a plurality of the digital devices. And, the wearable device 200 may not be directly connected with digital device(s) in a data transmission and reception process and may be able to transmit and receive data with the digital device(s) in a manner of being indirectly connected with a different digital device.

Meanwhile, although it is not depicted, if a communication protocol is not supported between the wearable device 200 and an external server 210 or a digital device or if there exist such various reasons as a long distance, noise, increase of power consumption, and the like, a relay or a router can be used between the wearable device 200 and the external server 210 or the digital device. The relay or the router may process data for the wearable device 200, the external server 210, or the digital device if necessary.

FIG. 3 illustrates a flowchart of a method of outputting content using a wearable device. Each step of FIG. 3 described in the following can be controlled by the processor 110 depicted in FIG. 1.

First of all, the wearable device can perform a communication access with a digital device [S10]. The communication access can be performed by a user input via the wearable device or the digital device. For instance, the wearable device can provide a separate button or a user interface to a user to perform the communication access with the digital device and the user can perform the communication access between the wearable device and the digital device via a user input using the button or the user interface. Before the communication access between the wearable device and the digital device is performed, the wearable device may be in a state of being paired with the digital device. Having performed the communication access with the digital device, the wearable device can transceive data with the digital device in a state that a session is opened.

The wearable device can detect a position state of the accessed digital device [S20]. The position state includes a first state that a display unit of the digital device is positioned at a predetermined angle of view area of the wearable device and a second state that the display unit of the digital device is not positioned at the angle of view area of the wearable device. The angle of view area is a predetermined area corresponding to a vision of a user wearing the wearable device and may include a section of a certain angle range in front of the wearable device.

The wearable device can detect the position state of the digital device using a plurality of antennas. In particular, the wearable device can transmit and receive data with the digital device via a plurality of the antennas installed in the wearable device. In this case, the wearable device can detect a relative position and a direction between the wearable device and the digital device accessed the wearable device using time difference, phase difference and the like of signals transmitted/received by each of a plurality of the antennas. By using a plurality of the antennas installed in the wearable device, although a direction (angle of direction) at which the digital device is positioned changes, the wearable device can precisely detect the position state of the digital device while constantly maintaining a distance between the digital device and the wearable device.

The wearable device can detect the position state of the digital device using an imaging sensor. In particular, in a state that the wearable device and the digital device are accessed with each other to perform a communication, the imaging sensor detects an image positioned within a predetermined angle of view area of the wearable device and may be then able to provide the image to the processor of the wearable device. The processor can detect whether there exist the digital device (or a display unit of the digital device), which has accessed the wearable device, within the angle of view area of the wearable device based on the image detected by the imaging sensor. For instance, having accessed the wearable device, the digital device can output a predetermined optical pattern and the wearable device can detect the optical pattern outputted by the digital device using the imaging sensor. In this case, the optical pattern may include at least one of a temporal pattern and a spatial pattern. Moreover, the optical pattern can be outputted by the display unit of the digital device.

If there exists the digital device, which has accessed the wearable device, in the angle of view area of the wearable device, the wearable device can detect the optical pattern outputted by the digital device using the imaging sensor. Yet, if there does not exist the digital device, which has accessed the wearable device, in the angle of view area of the wearable device, the optical pattern outputted by the digital device will not be detected by the imaging sensor. Meanwhile, although the digital device is positioned within the angle of view area of the wearable device, if the optical pattern is outputted via the display unit of the digital device and the display unit of the digital device does not face a user, the optical pattern will not be detected as well. In particular, if the user is unable to see the display unit of the digital device, the wearable device cannot detect the optical pattern. Hence, the wearable device can detect the position state of the digital device based on whether the optical pattern of the digital device is detected within the angle of view area of the wearable device.

The optical pattern can be outputted via the display unit of the digital device when a communication access is performed between the digital device and the wearable device, by which the present disclosure may be non-limited. The digital device can output the optical pattern by itself irrespective of whether the communication access is performed between the digital device and the wearable device.

The wearable device can output content displayed in the digital device in the wearable device based on the position state of the detected digital device. To this end, first of all, the wearable device determines whether the display unit of the digital device is positioned at the angle of view area of the wearable device based on the position state of the detected digital device [S30]. If the display unit of the digital device is positioned at the angle of view area of the wearable device, the wearable device may not output the content displayed in the digital device [S40]. On the contrary, if the display unit of the digital device is not positioned at the angle of view area, the wearable device can output the content displayed in the digital device [S42]. To this end, the wearable device receives the content displayed in the accessed digital device from the digital device and can output the received content in a display unit of the wearable device.

As mentioned in the foregoing description, in the state of being communication accessed with the digital device, the wearable device can trigger whether to output the content of the digital device based on a relative position state with the digital device. In particular, in a first state, i.e., the display unit of the digital device is positioned within the angle of view area of the wearable device, the wearable device does not output the content displayed in the digital device. In a second state, i.e., the display unit of the digital device is not positioned within the angle of view area of the wearable device, the wearable device can output the content displayed in the digital device. By doing so, in the second state, i.e., when a position of the digital device is out of a vision of a user wearing the wearable device, the user can receive the content of the digital device via the wearable device. And, in the first state, i.e., when the position of the digital device is within the vision of the user wearing the wearable device, the user can receive the content of the digital device via the digital device without interruption of the display (i.e., (virtual) screen) of the wearable device.

Meanwhile, if the position state of the detected digital device changes and the changed position state is maintained for more than a predetermined time period, the wearable device can trigger whether to output the content of the digital device. In particular, if the position state of the digital device changes from the first state, i.e., the content of the digital device is not outputted, to the second state, the wearable device can output the content of the digital device when the position state of the digital device maintains the second state for more than the predetermined time period. And, if the position state of the digital device changes from the second state, i.e., the content of the digital device is outputted, to the first state, the wearable device can terminate the output of the content of the digital device when the position state of the digital device maintains the first state for more than the predetermined time period.

Subsequently, the wearable device determines whether the wearable device is in a communication access with the digital device [S50]. If the wearable device is in the communication access with the digital device, back to the step S20 and detects the position state of the digital device paired with the wearable device. If the communication access between the wearable device and the digital device is disconnected, the wearable device terminates the output of the content of the digital device. In particular, the wearable device can detect the position state of the digital device in real time in the state of being communication accessed with the digital device. In this case, whether to output the content displayed in the digital device in the wearable device is determined based on the detected position state of the digital device. If the detected position state changes, whether to output the content displayed in the digital device in the wearable device is adjusted based on the changed position state. If the communication access between the wearable device and the digital device is disconnected, the wearable device can terminate both detecting the position state of the digital device and outputting the content of the digital device.

Figure 4:
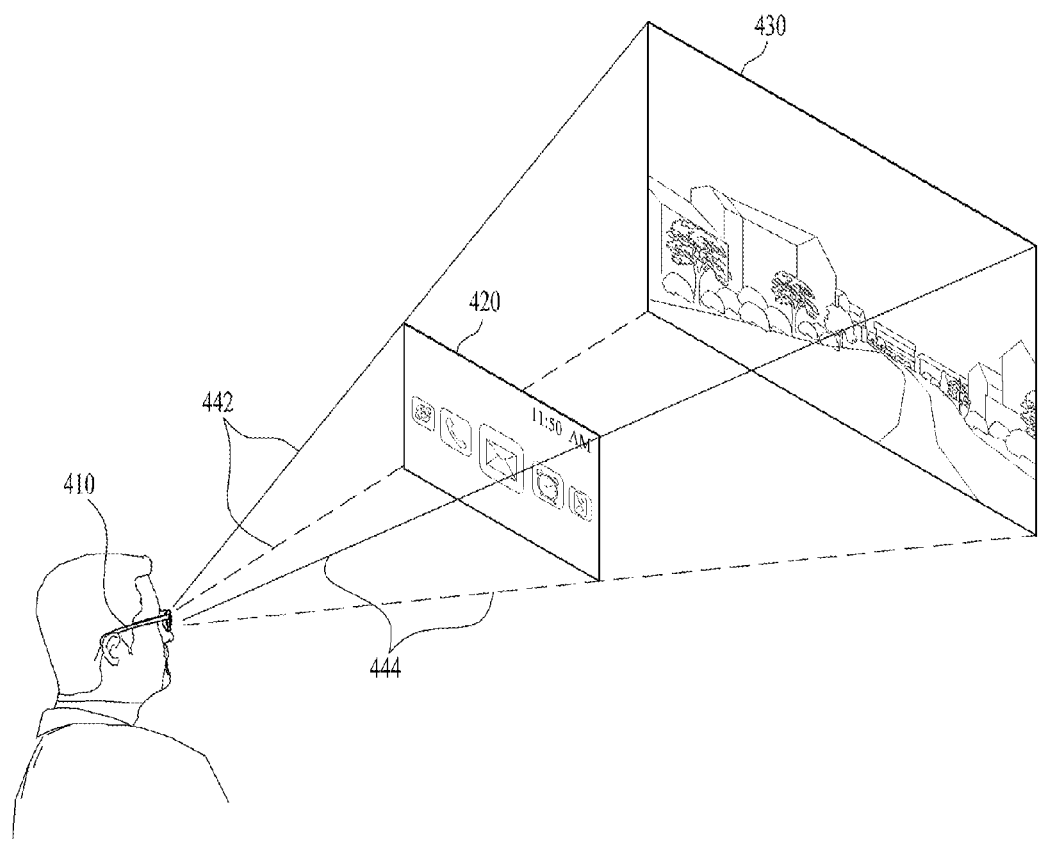
FIG. 4 illustrates a diagram for explaining a position of an image focused on a wearable device.

FIG. 4 illustrates a diagram for explaining a position of an image focused on a wearable device.

Meanwhile, in the present disclosure, an example that the wearable device 410 has adopted a see-through display as a display unit is explained. Hence, as depicted, a user wearing the wearable device 410 can see an outside view identical to a view seen by eyes of the user when the user does not wear the wearable device 410 irrespective of whether content is played or not in the wearable device. As mentioned in the foregoing description, when the wearable device 410 adopts the see-through display, in case that a user wears the wearable device 410, safety can be reinforced since the user can see an external view via the see-through display.

Referring to FIG. 4, if a user makes a request for playback of content via the wearable device 410, the content is outputted in a prescribed position. Yet, for instance, the prescribed position may correspond to a virtual concept on the basis of the user wearing the wearable device 410. In other word, in case that the user watches the content via the wearable device 410, the prescribed position in which the content is outputted can be represented as a position on which an image is focused. As depicted in the drawing, an image is generally focused between an external real view and the wearable device 410 and makes a user watch contents.

Moreover, as mentioned in the foregoing description, an image 420 can be implemented by a translucent display screen. For instance, as a screen is close to a black color, the screen can be seen as transparent in terms of a user.

In summary, if a user wears the wearable device 410, the user can see an external view like wearing normal glasses. The user can naturally watch content while moving and can secure safety via an image 420 focused between the external view and the wearable device 410.

Figure 5:
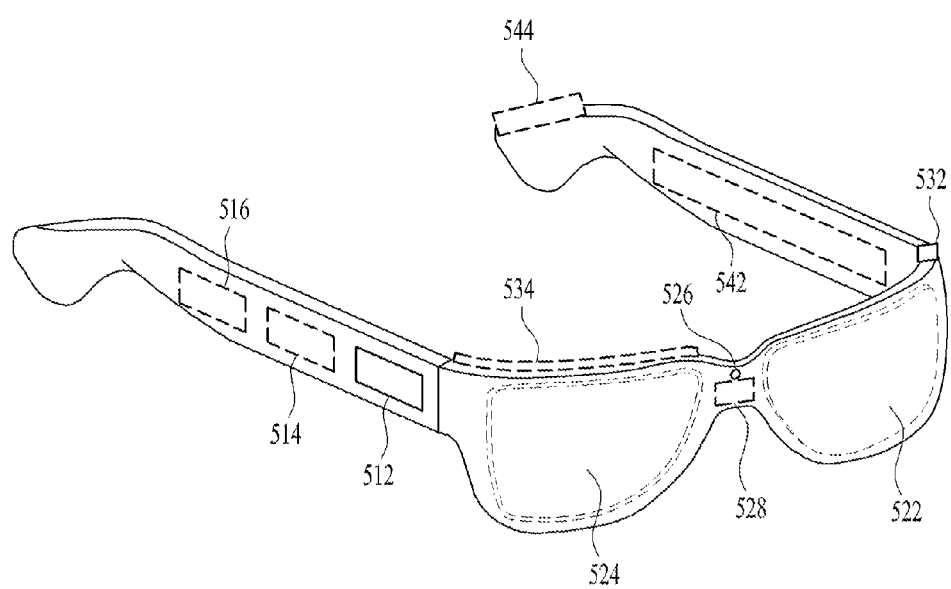
FIG. 5 and FIG. 6 illustrate diagrams for explaining elements and functions of a wearable device.
Figure 6:
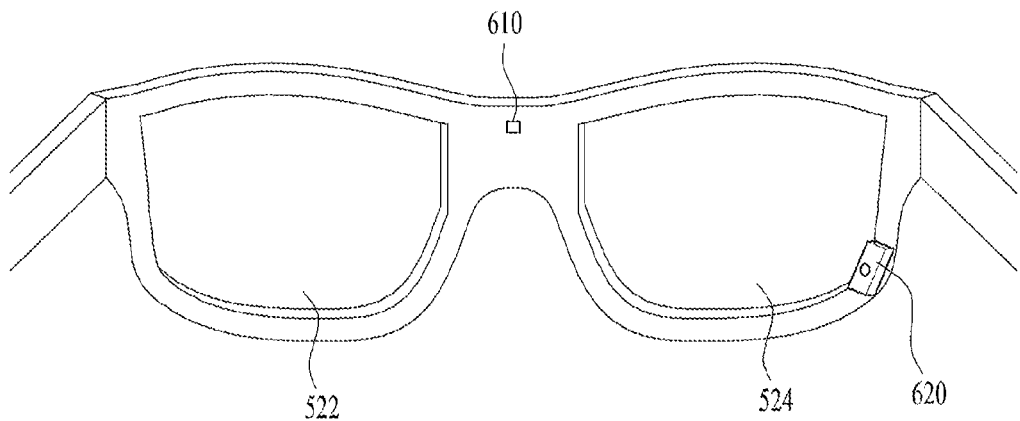

FIG. 5 and FIG. 6 illustrate diagrams for explaining elements and functions of a wearable device.

An external element of a glass-type wearable device and function of the glass-type wearable device are explained in detail with reference to FIG. 5 and FIG. 6.

The glass-type wearable device is mainly classified into a body part and a temple part.

The body part consists of a left/right display 522/524 configured to output content and has adopted a see-through display and a bridge part supporting the left/right display 522/524. As mentioned in the foregoing description, the bridge part can be used in a control process of the wearable device in a manner of being equipped with various interfaces or sensors according to a position of the bridge part except a basic function of supporting and fixing the left/right display 522/524. A camera sensor 526, a tracking system 528, and the like can be installed in a front side of the bridge part in between the left and the right display 522/524. In this case, the camera sensor 526 takes a picture of an image, a video, or the like and provides the sensed data to the processor 110. The tracking system 528 controls and tracks content outputted via the left/right display 522/524. Besides, a control unit 534 configured to control a resolution of an outputted content, a position on which an image is focused, or the like may exist on the top of the left/right display 522/524 corresponding to the bridge part. The control unit is implemented by a form of a touch pad and can control the resolution or the position on which the image is focused according to a left/right touch of a user. Moreover, a microphone 530 may be installed in the bottom of the left/right display 522/524 corresponding to the bridge part. The microphone 530 plays a role of an interface receiving an audio of an external and a user such as audio recording, searching, quick search, or the like. Audio data received via the microphone 530 can be processed by the processor 110. Besides, an antenna 532 may be installed in one side of the bridge part and may receive a signal, check sensitive, and the like.

A basic function of the temple part is to support or fix the wearable device to a part of a body of a user. The temple part consists of an exterior side and an interior side. The exterior side and the interior side may perform functions different from each other. The temple part can be classified into a left temple part and a right temple part in terms of a user. The exterior side of the right temple part includes a touch pad 516, a computing system & communication interface unit 514, a power unit 516, and the like in an order of being adjacent to the body part. Meanwhile, the interior side of the left temple part may correspond to an area 542 in which a battery is installed. Meanwhile, the interior side of the right temple part and the exterior side of the left temple part correspond to the aforementioned interior side of the left temple part and the exterior side of the right temple part, respectively and may be implemented by an identical configuration. Yet, it is apparent that each side of each temple part can be configured by configurations different from each other according to necessity. And, a part farthest away from the body part in the temple part, i.e., a tail part 544 may be used for a usage of a module for a specific function, an auxiliary battery, or the like.

For instance, FIG. 6 shows an inside of the body part of the wearable device.

A proximity sensor 610 is installed between the left and the right display 522/524. In this case, the proximity sensor 610 determines whether a user wears the wearable device and then determines whether the wearable device is in an active or an inactive state. The wearable device can perform a smart power management in a manner of minimizing power consumption according to a sensed state based on information sensed by the proximity sensor 610. If the state of the wearable device changes from the active state to the inactive state, the wearable device can perform such a function as stopping, bookmarking, storing, and the like of data in playing. Despite the wearable device becomes the inactive state, sensing information is continuously checked by the proximity sensor 610 to perform a function more adaptive to an intention of a user. If the inactive state is maintained for more than a predetermined time period, it may be able to automatically make the wearable device operate in a non-active mode (sleep mode).

Meanwhile, an eye tracking system or sensor (hereinafter, 'eye tracking sensor') 620 can be installed in one side or each side of the supporting part of the body part that supports the left/right display 522/524. The eye tracking sensor 620 basically collects sensing information in case that the wearable device is in the active state. In this case, the sensing information sensed by the eye tracking sensor can be used for performing various functions according to a current state of the wearable device. In this case, for instance, the state of the wearable device may correspond to such a functional aspect of the wearable device as playback of a current video data, receiving a text message, and the like. For instance, if a video data is playing in the wearable device, the playback of the video data can be stopped based on eye tracking sensing information. Or, in case that an image is outputted in the wearable device, a next image or a previous image can be outputted in the wearable device based on the sensing information. Besides, similar to the aforementioned proximity sensor 610, the sensing information may be used to determine whether the wearable device is in an active state or an inactive state. For instance, there may exist a case that the sensing information data is not collected for more than a predetermined time period all at once. In this case, it may be mainly predictable by two. One is a case that a user has taken off the wearable device and another one is a case that the user closes eyes of the user for a long time. In the former case, it is naturally determined as the inactive state and the wearable device is switched to a non-active mode. Yet, in the latter case, it is difficult for the proximity sensor or other different sensor to determine a state. For instance, although a tilt sensor or a movement sensor may determine whether the user is sleeping, it is still imperfect. Yet, since an ordinary person closes eyes while sleeping, it may be able to determine whether a user is sleeping or not in a manner of independently using the eye tracking information or combining the eye tracking information with information sensed by the tilt sensor or the movement sensor. If the state of the wearable device is determined as the inactive state, the wearable device is automatically switched to the non-active mode, thereby managing power of the wearable device and providing convenience to the user.

Figure 7:
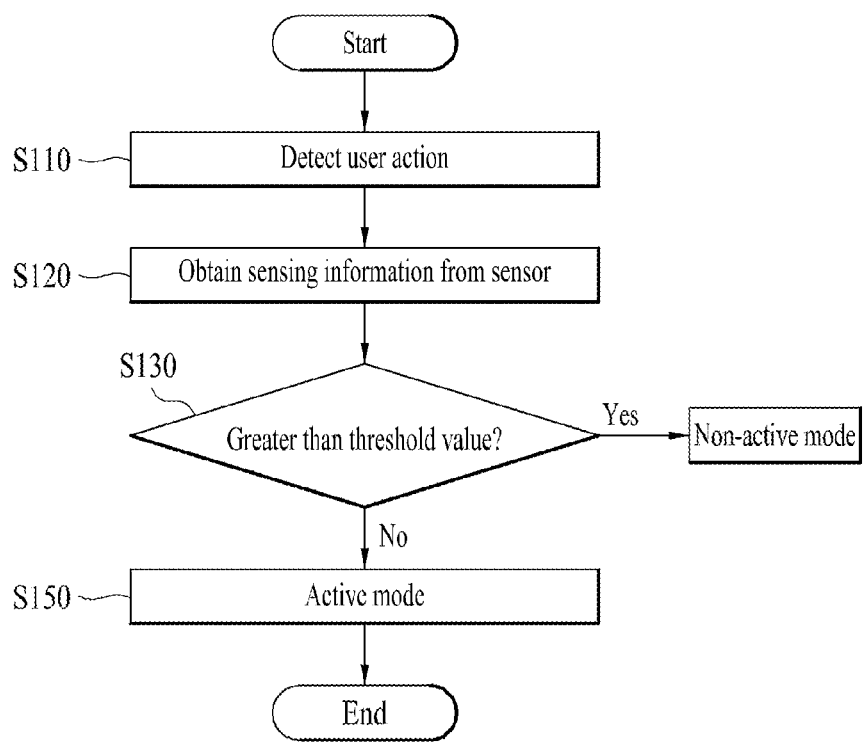
FIG. 7 illustrates a flowchart for explaining a method of controlling modes of a wearable device.

FIG. 7 is a flowchart for explaining a method of controlling modes of a wearable device.

If a certain action of a user wearing the wearable device is detected, the wearable device obtains sensing information using at least one sensor [S120]. For instance, the sensing information is used for determining a mode of the wearable device. Meanwhile, as mentioned in the foregoing description, the sensor used for determining a mode of the wearable device includes such various sensors as a proximity sensor, an eye tracking sensor, a movement sensor, a microphone sensor, a camera sensor, and the like. Meanwhile, the wearable device can use sensing information in a manner of combining the sensing information sensed by at least one of the aforementioned sensors or a plurality of sensors to determine the mode of the wearable device.

The wearable device compares a generated mode data value with a predetermined threshold value based on the sensing information obtained from sensor(s). If the generated mode data value is equal to or greater than the threshold value, the wearable device determines it as a non-active mode and switches a mode of the wearable device to the non-active mode [S140]. On the contrary, if the generated mode data value is less than the threshold value, the wearable device determines it as an active mode and switches the mode of the wearable device to the active mode [S150]. Meanwhile, in the aforementioned description, in case of switching the mode, a change can be made according to a mode state of the wearable device immediately before the mode is determined or the corresponding mode can be continuously maintained as well.

Meanwhile, although it is described that determining whether the mode is switched starts from detecting an action of the user, it can be periodically performed irrespective of detecting the action of the user. And, a user interface including an introduction phrase regarding the mode switching is provided on a display of the wearable device step by step prior to all switching to minimize inconvenience of the user due to the mode switching.

Figures 8, 9:
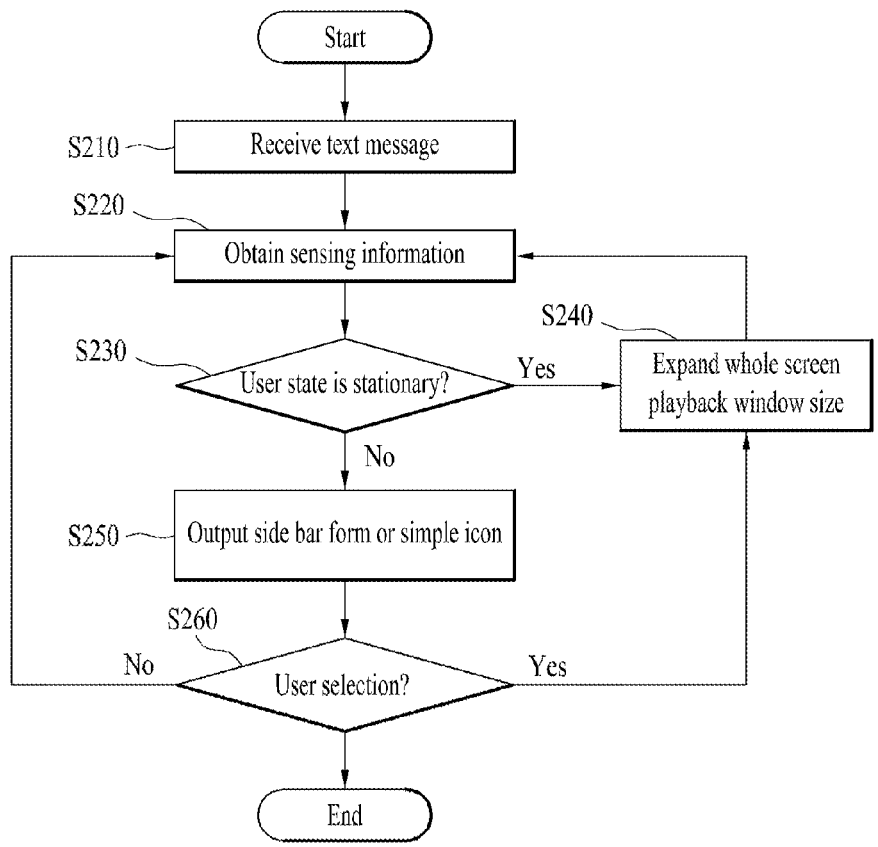
FIG. 8 illustrates a diagram for explaining a method of obtaining user information using information on sensors installed in a wearable device.
FIG. 9 and FIG. 10 illustrate diagrams for explaining a method for a wearable device to process a message in case of receiving the message in the wearable device.

FIG. 8 illustrates a diagram for explaining a method of obtaining user information using information on sensors installed in a wearable device.

FIG. 8 is a diagram for explaining an example of utilizing sensing information sensed by a sensor to describe a differentiated content provision in the aforementioned mode switching process in FIG. 7 or a user state in the following description.

For clarity, FIG. 8 is explained with an example of a GPS sensor, a gyro sensor, an acceleration sensor, an eye tracking sensor, and the like.

Referring to FIG. 8, values of sensing information for a state or a mode of a user is defined in advance by a random table form and the values can be used for a future determination.

For instance, if a user watches content via the display of the wearable device while not moving, GPS sensing information sensed by the GPS sensor is almost '0', gyro sensing information sensed by a gyro sensor is much smaller than a first threshold value, acceleration sensing information sensed by an acceleration sensor is almost '0' as well, and it may define a state that a size of a pupil is fixed and there is little movement of the pupil based on eye tracking sensing information, which has sensed the pupil captured by an eye tracking sensor.

Similarly, if a user watches content via the display of the wearable device while moving, the GPS sensing information sensed by the GPS sensor is much smaller than a second threshold value, the gyro sensing information sensed by the gyro sensor is not '0', the acceleration sensing information sensed by the acceleration sensor is much smaller than a third threshold value, it may define a state that the size of the pupil is modified and there is a movement of the pupil based on the eye tracking sensing information, which has sensed the pupil captured by the eye tracking sensor.

And, if a user watches content via the display of the wearable device while moving in a manner of boarding a vehicle, the GPS sensing information sensed by the GPS sensor is much greater than the second threshold value, the gyro sensing information sensed by the gyro sensor is not '0', the acceleration sensing information sensed by the acceleration sensor is much greater than the third threshold value, it may define a state that the size of the pupil is fixed and there is little movement of the pupil based on the eye tracking sensing information, which has sensed the pupil captured by the eye tracking sensor. When the aforementioned case is limited to a case that the user does not drive the vehicle, if the user drives the vehicle, the GPS sensing information sensed by the GPS sensor is much greater than the second threshold value, the gyro sensing information sensed by the gyro sensor is not '0', the acceleration sensing information sensed by the acceleration sensor is much greater than the third threshold value, it may define a state that the size of the pupil is modified and there is a movement of the pupil based on the eye tracking sensing information, which has sensed the pupil captured by the eye tracking sensor.

Besides, although it is not depicted in FIG. 8 of the present disclosure, content necessary for various statuses, states, user intention, mode determination, and the like can be defined in advance and it may use the content based on future sensing information.

Figure 10:
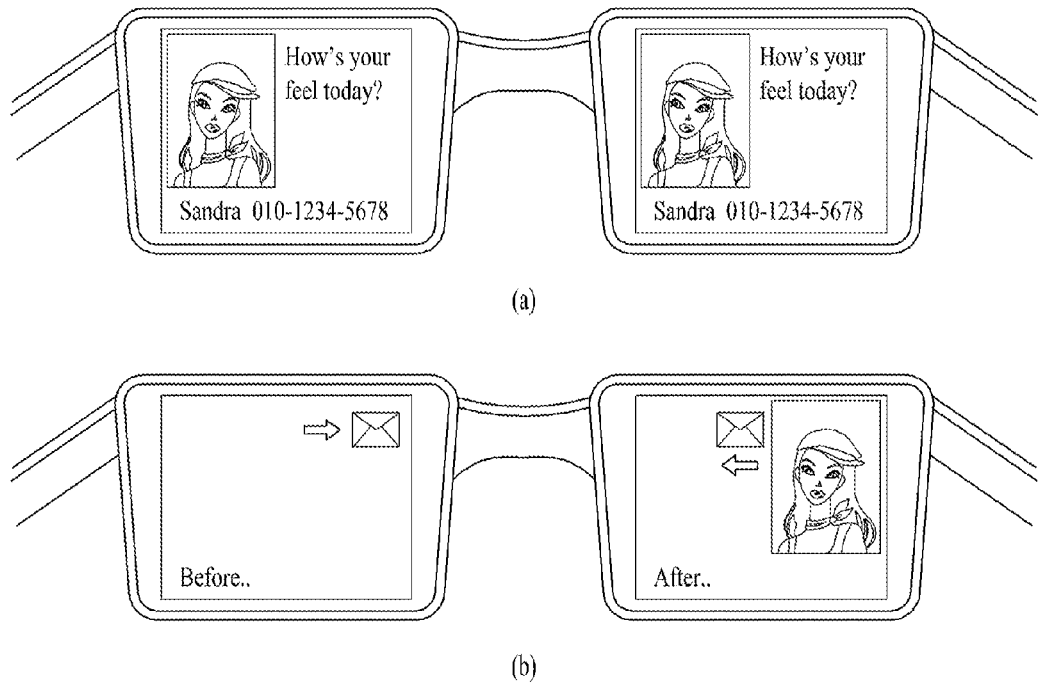

FIG. 9 and FIG. 10 illustrate diagrams for explaining a method for a wearable device to process a message in case of receiving the message in the wearable device.

In case that the wearable device receives a text message, an E-mail, and the like from an external according to a communication protocol, FIG. 9 and FIG. 10 illustrate diagrams for explaining content to process the text message, the E-mail, and the like. Meanwhile, this sort of message processing can be classified according to a state of a user wearing the wearable device, i.e., a case that the user is moving and a case that the user is stationary.

The wearable device receives a message from an external device according to a communication protocol [S210].

According to a request of the step S210, the wearable device obtains sensing information to output a user interface required to receive the message [S220].

The wearable device determines a user state based on the sensing information obtained in the step S220 [S230]. After determining the user state, if the user state corresponds to a stationary state, the received message is immediately provided [S240]. In this case, for instance, since the provided message is in the stationary state, the message can be provided in a manner of being expanded to a whole screen playback window size. On the contrary, after determining the user state, if the user state does not correspond to the stationary state, in particular, if the user state corresponds to a moving state, a side bar form or an icon indicating whether the message is received is provided to the user instead of immediately providing the received message to the user [S260]. Subsequently, if the user accesses the side bar form or the icon based on a selection of the user, eye tracking information, or the like, the message can be displayed in a manner of being expanded to a whole screen playback window size. Meanwhile, if the user is moving, instead of the whole screen playback window, the message can be provided to the user with a half or a part of screen playback window form despite of the selection of the user.

FIG. 10 (a) illustrates an example of a screen providing a message in case that a user is not moving and FIG. 10 (b) illustrates an example of a screen providing a message in case that the user is moving. Referring to FIG. 10 (a) to FIG. 10 (b), if there exists content currently watching, playback of the content is temporarily stopped and a message is provided as shown in the drawings. If processing the message is completed, the content can be automatically played again. Meanwhile, unlike FIG. 10 (a) to FIG. 10 (b), if there exists content currently watching, both the content and a message can be provided at the same time in a manner that a screen is divided.

Figure 11:
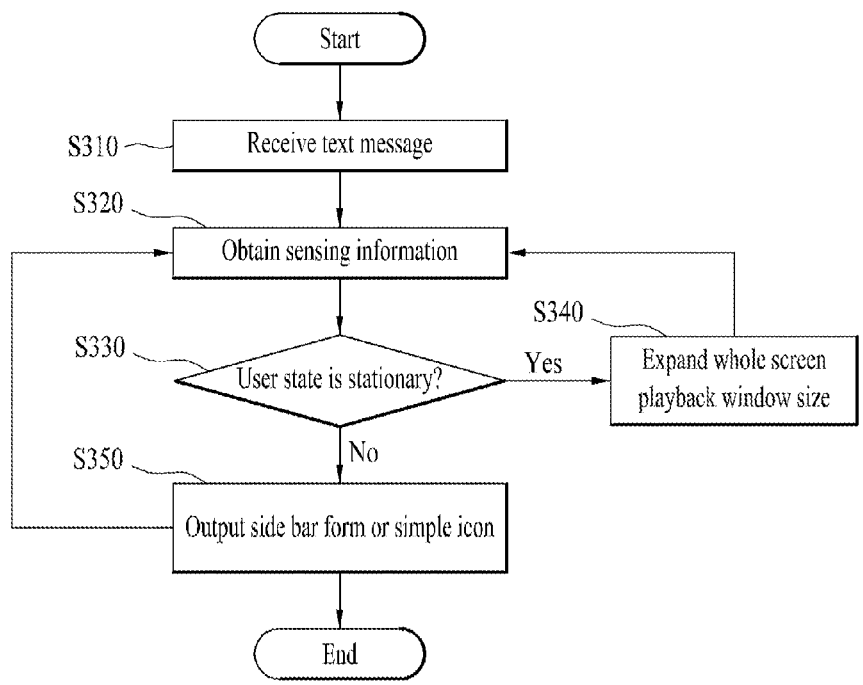
FIG. 11 and FIG. 12 illustrate diagrams for explaining a method for a wearable device to process video data.
Figure 12:
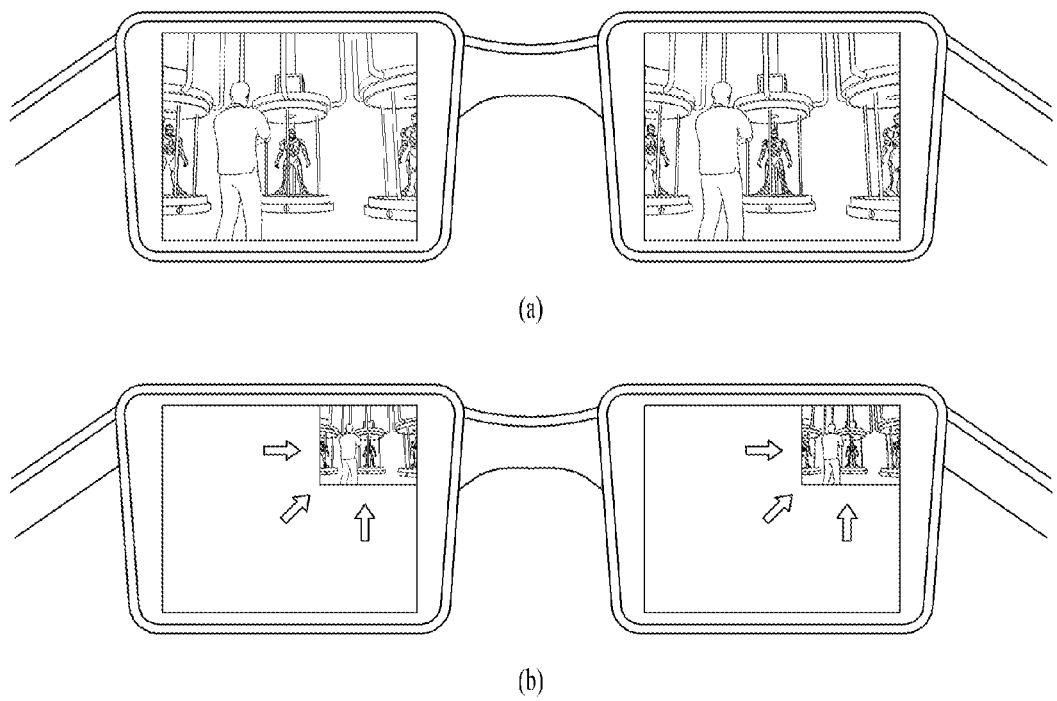

FIG. 11 and FIG. 12 illustrate diagrams for explaining a method for a wearable device to process video data.

Especially, FIG. 11 and FIG. 12 explain a method of processing video data in case that a video is watched in the wearable device.

Referring to FIG. 11, if a request for playing a video is received from a user [S310], the wearable device obtains sensing information [S320].

The wearable device determines a user state based on the sensing information obtained in the step S320 [S330]. After determining the user state in the step S330, if the user state is determined as a stationary state (a non-active state or mode), a video player is provided in a manner of being expanded to a window size (or whole window) as depicted in FIG. 12 (A). If the user state is determined as a moving state (an active state or mode), the video player is provided in a manner of being reduced as depicted in FIG. 12 (b) [S350].

Meanwhile, as depicted in FIG. 12 (b), for instance, a playback window of the video player, which is provided in a manner of being reduced, is outputted in the top right area of the display screen area, by which the present invention may be non-limited. In this case, the reduced window can be expanded or reduced according to a selection of a user.

As depicted in FIG. 12 (b), in case that a video is provided in a manner of being reduced since a user is moving, an audio level can also be automatically provided in a manner of being lowered in accordance with the reduced video.

Figure 13:
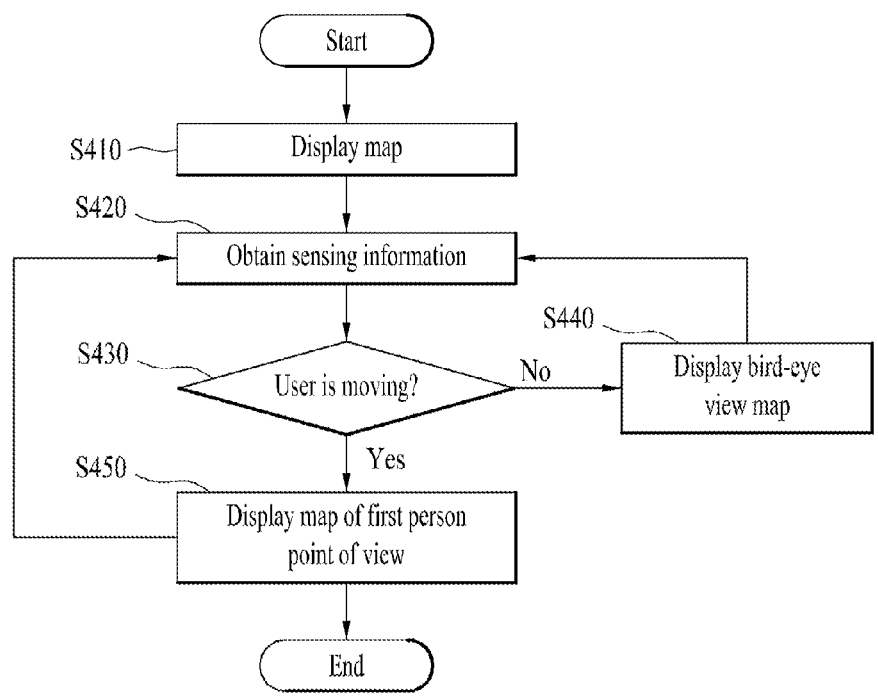
FIG. 13 and FIG. 14 illustrate diagrams for explaining a method for a wearable device to process an application in case of using the application in the wearable device.
Figure 14:
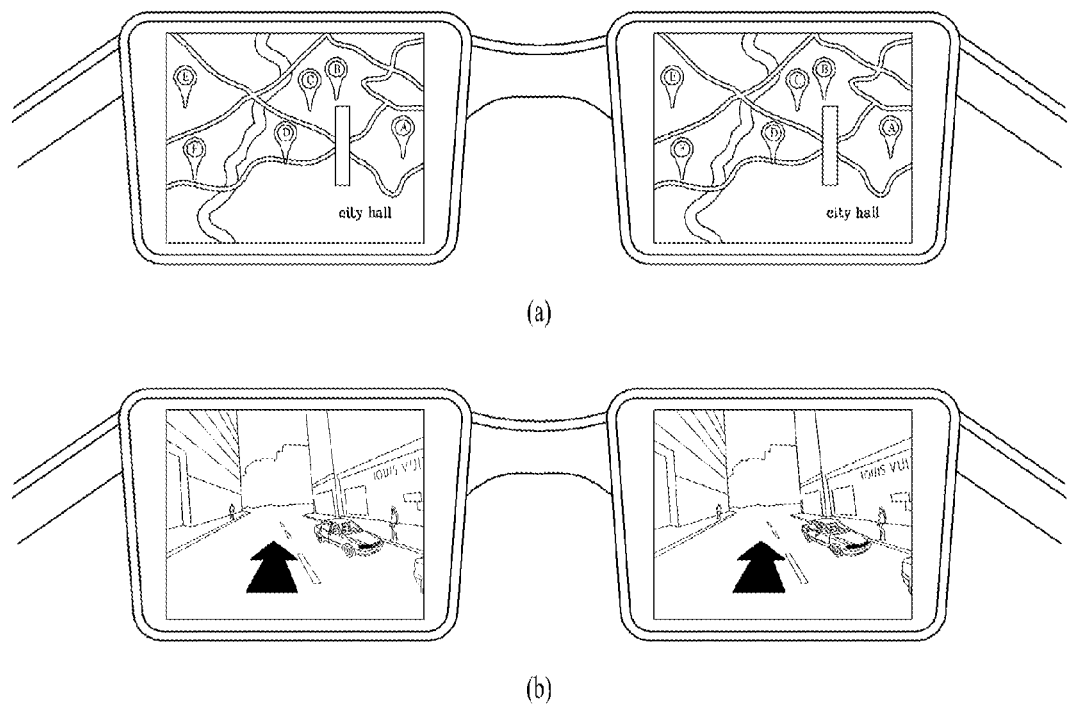

FIG. 13 and FIG. 14 illustrate diagrams for explaining a method for a wearable device to process an application in case of using the application in the wearable device.

FIG. 13 and FIG. 14 explain a method of processing and using map information in the wearable device.

Referring to FIG. 13, if a request for outputting map information is received from a user [S410], the wearable device obtains sensing information [S420]. In this case, the map information can be provided via a map application.

The wearable device determines a user state based on the sensing information obtained in the step S420 [S430]. After determining the user state in the step S430, if the user state corresponds to a stationary state, the wearable device provides map information of a bird-eye view form to a user as depicted in FIG. 14 (a) [S440]. On the contrary, if the user state corresponds to a moving state, the wearable device provides map information of the first person point of view to the user [S450].

Meanwhile, as depicted in FIG. 14 (b), instead of providing the map information of the first person point of view, the map information of the bird-eye view form can be provided in a manner that an area of the map information is further reduced as depicted in FIG. 14 (a). In this case, the reduced map information can be provided to a part of area of the display screen in a manner of being mapped.

Besides, although it is not depicted in the drawing, the map information depicted in FIG. 14 can be provided or modified by such various forms as a sky view, a satellite, and a cadastral map form in accordance with such various statuses as user selection, configuration, and the like.

And, in case that the user drives the vehicle, TPEG (transport protocol expert group) information on surrounding traffic status is received and provided it to the user. Or, CCTV (closed-circuit television) image can be provided to the user together with the TPEG information or independently provided to the user. Despite of a sort of map information request, the wearable device automatically processes the information request to a navigation information form in accordance with a user state and may be then able to provide the processed information to the user.

Besides, as depicted in FIG. 14 (b), in case of the map information of the first person point of view, the wearable device can additionally provide information on a surrounding famous restaurant and the like using augmented reality and the like.

The wearable device may selectively provide a specific map application among various map information providing applications in response to the map information request of the user based on a user selection, a network status, or the like.

Meanwhile, the wearable device provides initial map information to the user based on a position of the user according to GPS sensing information. Yet, if there is address information inputted by the user in advance and the like, the wearable device may follow the address information. And, the wearable device may move the initial map information to a target position on the map or provide map information of a specific position to the user in a manner of reducing or expanding it based on eye tracking sensing information.

Figure 15:
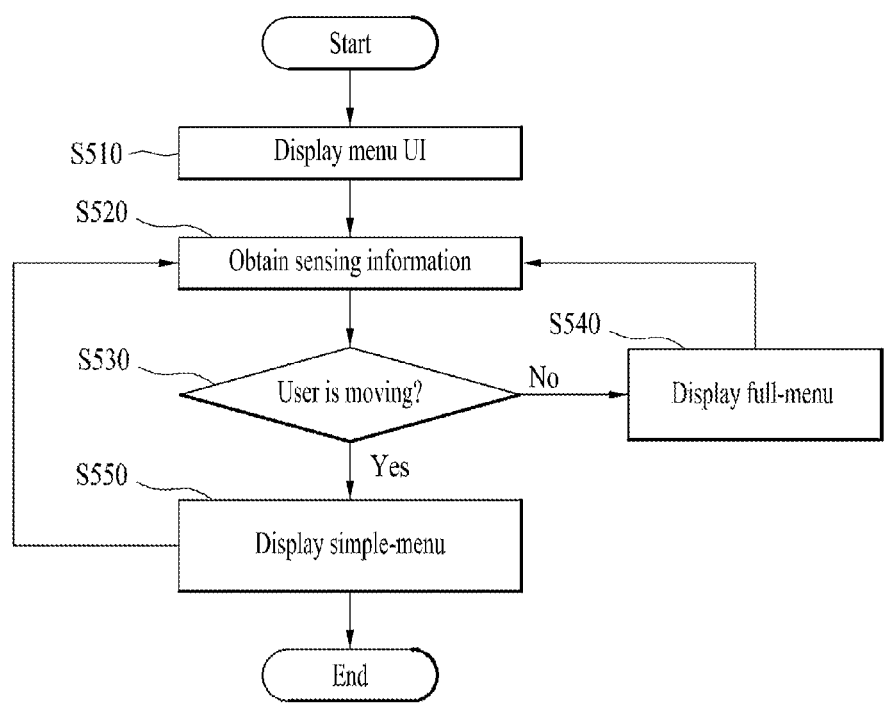

FIG. 15 and FIG. 16 are diagrams for explaining an example of a method of providing a user interface according to a status of a user wearing a wearable device.

FIG. 15 and FIG. 16 relates to content of providing a user interface to the user using the wearable device according to a status. For instance, the user interface may be used to configure the wearable device and can be provided to the user in various forms according to an application, a function, a screen, and the like currently used in the wearable device.

If a request for providing a menu user interface is received [S510], the wearable device obtains sensing information [S520].

The wearable device determines a user state based on the sensing information obtained in the step S520.

After determining the user state in the step S530, if the user state corresponds to a stationary state, the wearable device outputs a user interface (full-menu UI) in a whole display screen as depicted in FIG. 16 (a) [S540]. If the user state corresponds to a moving state, the wearable device outputs a user interface (simple-menu UI) in a part of area of the display screen as depicted in FIG. 16 (b) [S550].

The full-menu user interface can include such a user interface element as a text, an image, a video, a button, a list, a checkbox, and the like. The simple-menu user interface is configured not to interrupt a movement of a user in a manner of being displayed in a part of a screen. The simple-menu user interface can include the full-menu user interface and the user interface element. Yet, as depicted in FIG. 16 (b), for clarity, the simple-menu user interface is provided using a minimum user interface element only. In this case, for instance, the minimum user interface can be selected based on a user state or status, a previous experience of the user, or the like. In particular, as depicted in FIG. 16 (b), it would be better that the simple-menu user interface is outputted as a bar form in the bottom of the screen in terms of readability. And, although it is not depicted in the drawing, the simple-menu user interface can be provided by a bar form in the top of the screen or the left/right side of the screen. In some cases, the simple-menu user interface can be simultaneously provided by a bar form in the top, bottom, left and right side of the screen. Or, although a mapping is performed in advance, mapped simple-menu user interface information of a corresponding side can be provided based on the eye tracking sensing information.

Figure 17:
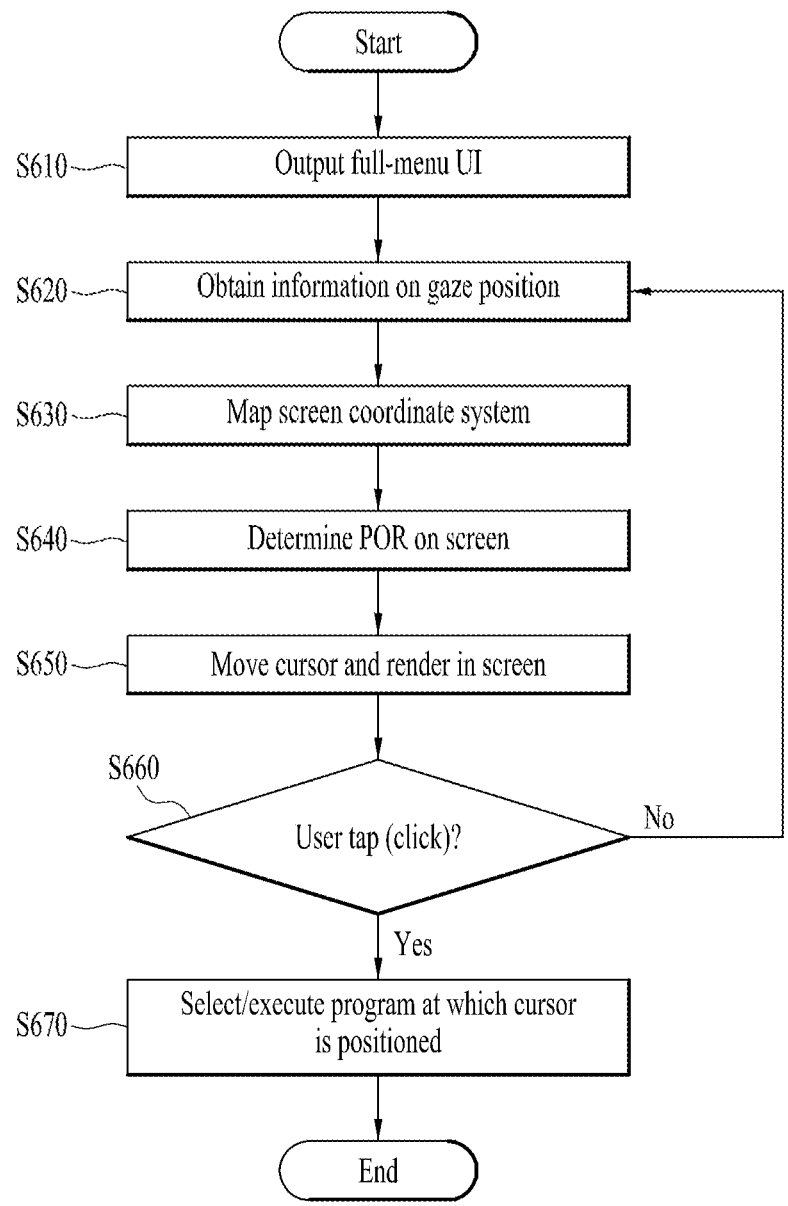
FIG. 17 and FIG. 18 illustrate diagrams for explaining a method of providing a user interface and a method of processing the user interface in case that a user wearing a wearable device does not move.
Figure 18:
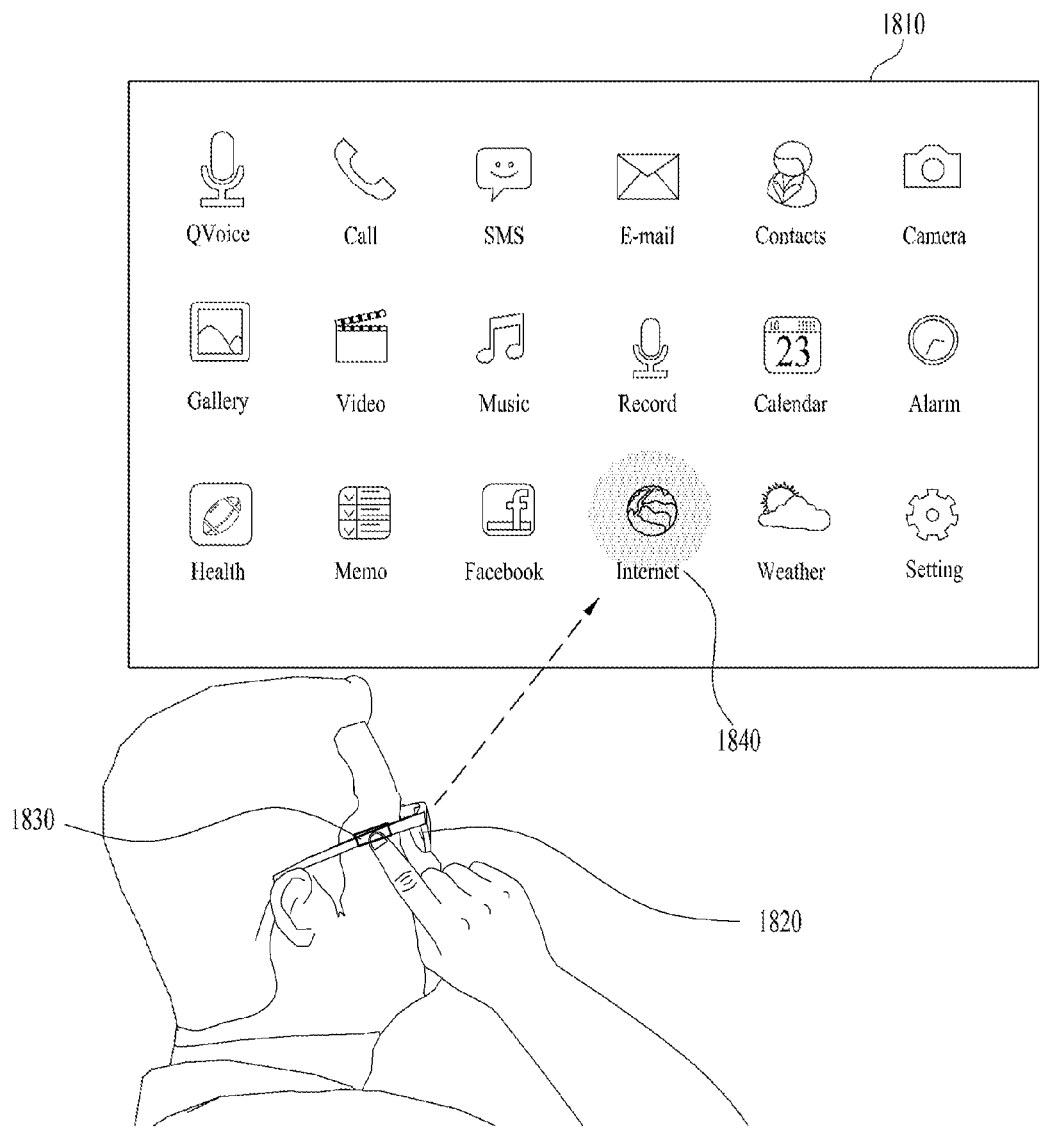

FIG. 17 and FIG. 18 illustrate diagrams for explaining a method of providing a user interface and a method of processing the user interface in case that a user wearing a wearable device does not move.

In particular, in case that the user does not move, i.e., in case that the user is in a stationary state, FIGS. 17 and 18 are depicted to more specifically describe a method of controlling the user interface.

Referring to the aforementioned flows of FIG. 15 to FIG. 16, if a user state corresponds to a stationary state, the wearable device outputs a full-menu user interface in a display screen [S610].

Subsequently, the wearable device obtains information on a gaze position of the user [S620]. In this case, for instance, the information on the gaze position of the user may correspond to eye tracking sensing information obtained by an eye tracking sensor. Meanwhile, the information on the gaze position can consist of orthogonal coordinate system information, i.e., x coordinate and y coordinate form.

The wearable device maps the obtained information on the gaze position to the full-menu user interface coordinate system information which is stored in advance [S630].

The wearable device determines a Point of Regard (POR) on a screen based on a mapped result of the step S630 [S640].

If the POR on the screen is determined in the step S640, the wearable device moves a cursor and renders it to the screen [S650].

Subsequently, the wearable device determines whether there is a selective input 1830 of a user. For instance, as depicted in FIG. 18, the selective input may correspond to a tap or a click 1830 on such a related function button as a touch pad and the like [S660]. After determining whether there is the selective input, if the tap or the click of the user is not performed, it may repeat the step S620 to the step S650 again. Yet, if the tap or the click 1830 of the user is performed, the wearable device selects an item on which the corresponding cursor is positioned and executes the item [S670].

Referring to FIG. 18, if the full-menu user interface 1810 is outputted, the wearable device catches whether a pupil 1820 of the user moves via the eye tracking sensor. By doing so, if the pupil of the user moves, the wearable device provides a cursor on the full-menu user interface. When the cursor is provided, the eye tracking sensor moves a position of a pointer on the display screen according to a movement of the pupil based on the movement of the pupil 1820 after the cursor is provided. Thereafter, an item 1840 on which the cursor is positioned, a program, and the like can be selected and played based on a further different input 1830 of the user.

Figure 19:
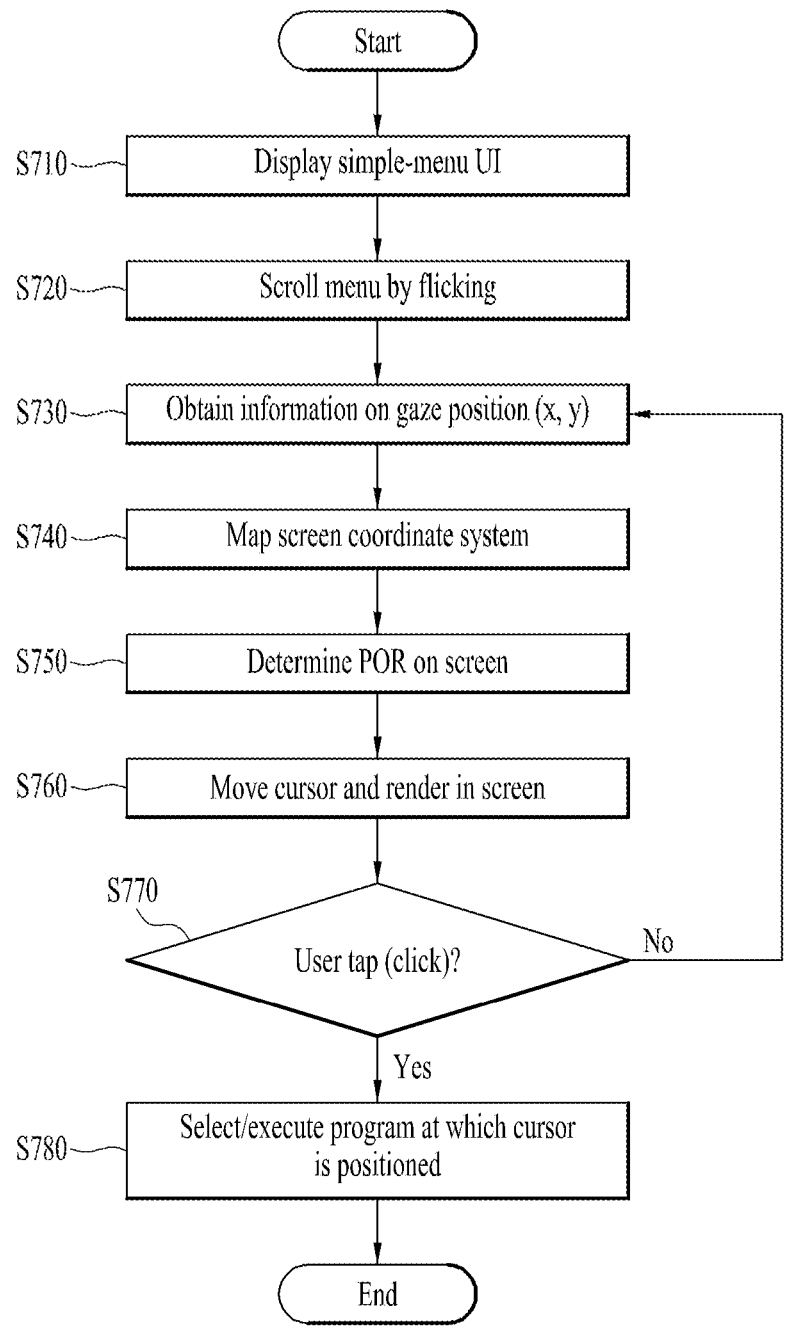
FIG. 19 and FIG. 20 illustrate diagrams for explaining a method of providing a user interface and a method of processing the user interface in case that a user wearing a wearable device moves; and FIG. 21 to FIG. 28 illustrates a diagram for explaining a method of controlling a wearable device according to a user action.
Figure 20:
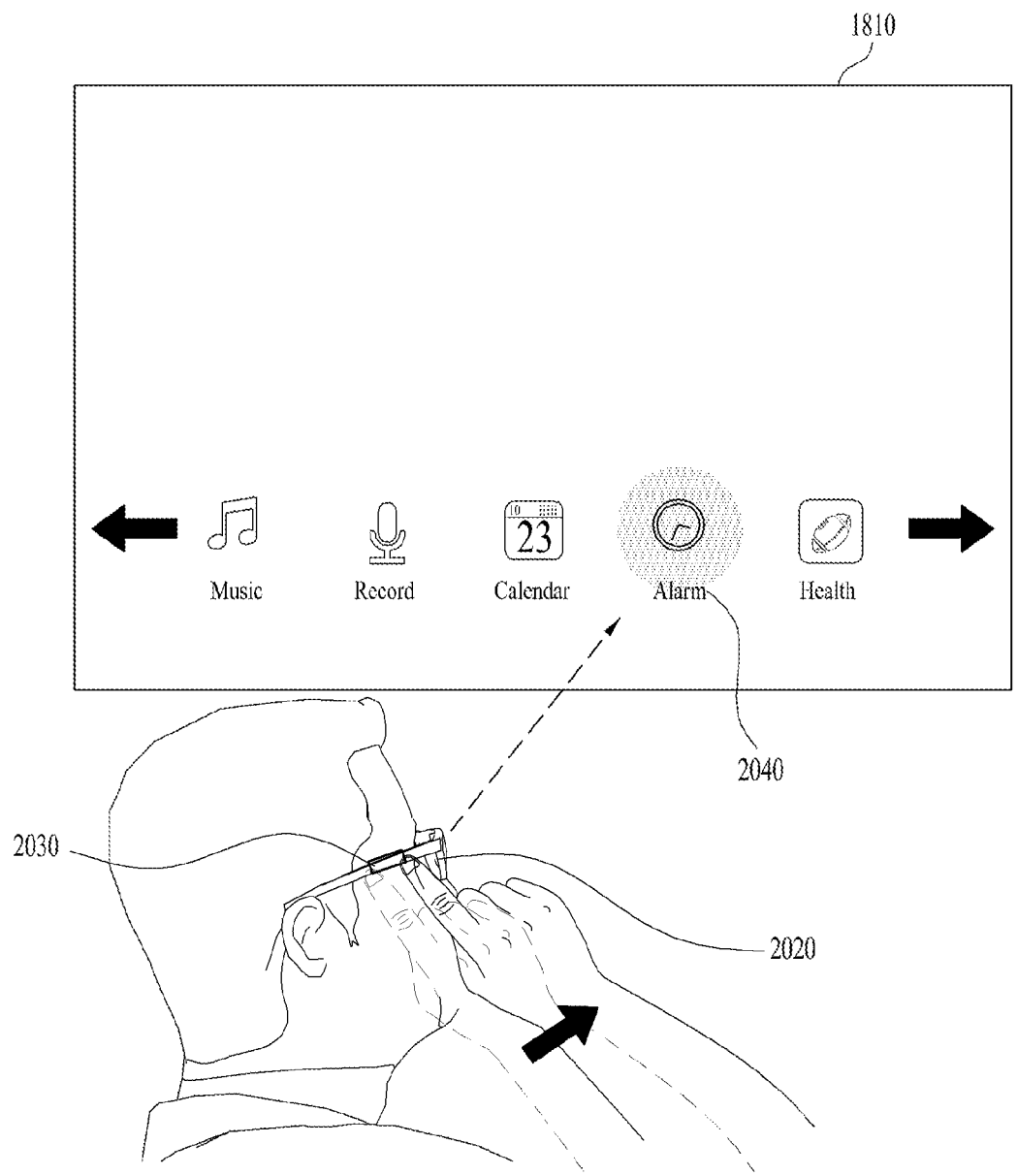

FIG. 19 and FIG. 20 are diagrams for explaining a method of providing a user interface and a method of processing the user interface in case that a user wearing a wearable device moves.

For instance, FIG. 19 and FIG. 20 are depicted to explain an example of providing a simple-menu user interface in case that a user moves, which is corresponding to the aforementioned FIG. 17 and FIG. 18. In this case, the content of FIG. 15 to FIG. 16 can be invoked if necessary.

Referring to the aforementioned flows of FIG. 15 to FIG. 16, if a user state corresponds to a moving state, the wearable device outputs a simple-menu user interface 2010 in a part of a display screen [S710].

Subsequently, the wearable device receives an input for a menu scroll from a user [S720]. In this case, for instance, the menu scroll input can be performed by flicking a touch pad of the wearable device or the like by the user instead of a pupil.

Subsequently, the wearable device obtains information on a gaze position of the user [S730].

In this case, for instance, the information on the gaze position of the user may correspond to eye tracking sensing information obtained by an eye tracking sensor. Meanwhile, the information on the gaze position can consist of orthogonal coordinate system information, i.e., x coordinate and y coordinate form.

The wearable device maps the obtained information on the gaze position to the full-menu user interface coordinate system information which is stored in advance [S740].

The wearable device determines a POR on a screen based on a mapped result of the step S740 [S750].

If the POR on the screen is determined in the step S750, the wearable device moves a cursor and renders it to the screen [S760]

Subsequently, the wearable device determines whether there is a selective input 2030 of a user. For instance, as depicted in FIG. 20, the selective input may correspond to a tap or a click 2030 on such a related function button as a touch pad and the like [S770]. After determining whether there is the selective input, if the tap or the click of the user is not performed, it may repeat the step S730 to the step S760 again. Yet, if the tap or the click 2030 of the user is performed, the wearable device selects an item on which the corresponding cursor is positioned and executes the item [S780].

Referring to FIG. 20, if the simple-menu user interface 2010 is outputted, the wearable device catches whether a pupil 2020 of the user moves via the eye tracking sensor. By doing so, if the pupil 2020 of the user moves, the wearable device provides a cursor on the simple-menu user interface. When the cursor is provided, the eye tracking sensor moves a position of a pointer on the display screen according to a movement of the pupil based on the movement of the pupil 2020 after the cursor is provided. Thereafter, an item 2040 on which the cursor is positioned, a program, and the like can be selected and played based on a further different input 2030 of the user.

FIG. 21 to FIG. 28 illustrates a diagram for explaining a method of controlling a wearable device according to a user action.

FIG. 21 to FIG. 28 describes the method of controlling the wearable device according to the user action or a user state.

FIG. 21 is a diagram for explaining a method of controlling a position of an image for a display screen in which content is outputted according to a user action.

For instance, as depicted in FIG. 21 (a), an image can be controlled to be focused on a position different from a position 2110 on which the image is initially focused according to a user action. As mentioned in the foregoing description, in controlling the position on which the image is focused, there exist various schemes of determining a user intention together with the aforementioned content. Yet, in this case, as depicted in FIG. 21 (b), the user intention is determined on the basis of a hand movement of a user. In this case, a sensor, a chip, a smart watch, or a mobile device, which is necessary to properly recognize the hand movement of the user, may play a role of a medium. Or, the user intention can be determined based on the hand movement of the user captured by a camera sensor of an external device.

As mentioned in the forgoing description, a first point 2110 is the position on which the image implemented in the wearable device is focused and may correspond to a default value. As depicted in FIG. 21 (b), if a user moves from an initial first hand movement 2115 to a second hand movement 2125, in particular, if the user moves from the first point 2115 to the second point 2125 toward a body of the user, a second position 2120 can be determined based on information on a distance between the first point 2115 and the second point 2125, a count, speed, acceleration, and the like. If an image is focused on the second position 2120, a size of a display screen is enlarged and resolution may become higher compared to the image focused on the first position 2110. On the contrary, if the user moves from the first point 2115 to a third point 2135 toward an opposite direction of a body of the user, a third position 2130 can be determined based on information on a distance between the first point 2115 and the third point 2135, a count, speed, acceleration, and the like. If an image is focused on the third position 2130, a size of a display screen is enlarged and resolution may become higher compared to the image focused on the first position 2110.

Meanwhile, the aforementioned relates to a method of changing a position on which an image of a display screen itself is focused. If the wearable device is able to obtain object information via MPEG-4 or the like for content, the wearable device can see a specific item, a specific menu 2140, or the like only in a manner of enlarging or reducing the specific item, the specific menu 2140, or the like using the aforementioned scheme instead of the display screen itself.

Figure 22:
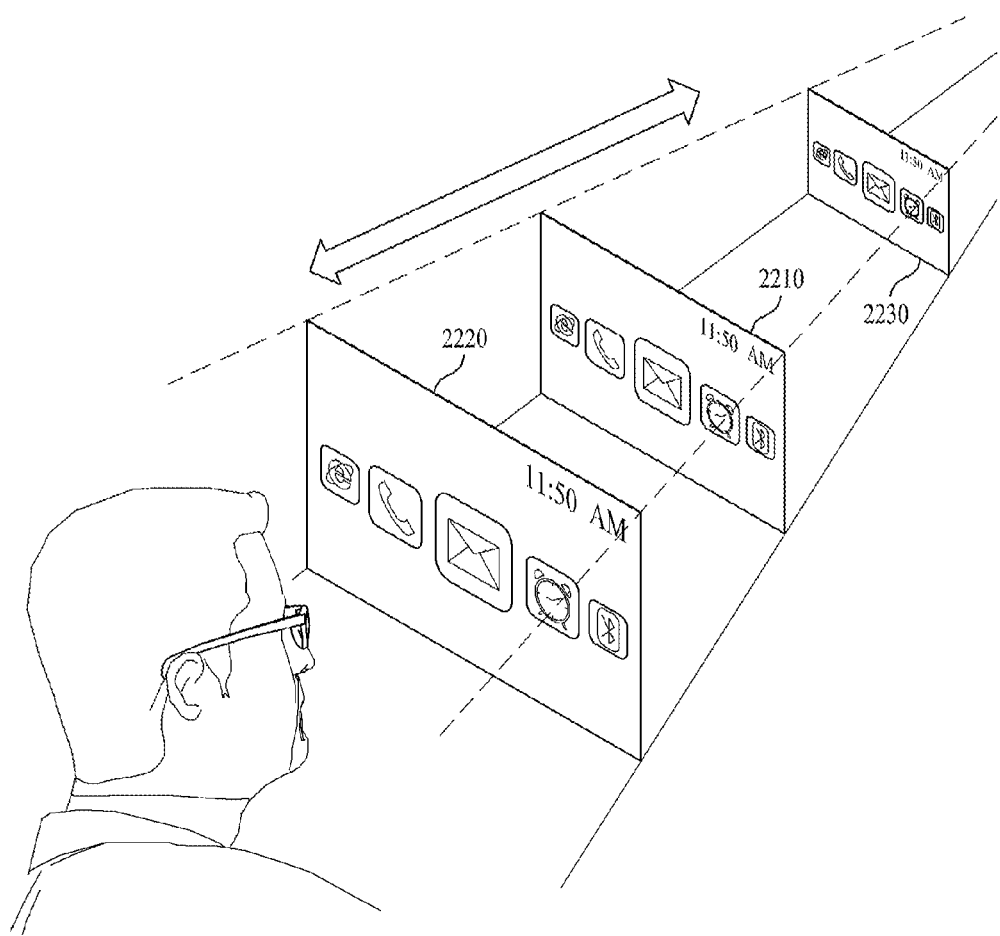

FIG. 22 illustrates a diagram for explaining a configuration of the wearable device.

In this case, the configuration can be performed according to a change of a user when the user sets the wearable device after initially purchasing the wearable device or when the wearable device is in use.

Referring to FIG. 22, a position (first position) 2210 on which an image of a display screen is focused in the wearable device can be provided as a default.

As disclosed in the present disclosure, if the wearable device adopts a see-through display, a user can wear the wearable device like glasses. In this case, sight information of users wearing the wearable device may vary. One user may have very poor sight and another user may have very good sight. And, one user may have nearsightedness, another user may have farsightedness, and the other user may have astigmatism. Hence, if an image for a display screen is uniformly focused on a default position regardless of the aforementioned condition or the image for the display screen is not modifiable, it may make a corresponding user to be inconvenient.

Hence, the wearable device can change a position on which an image of a display screen is focused based on a hand movement or an action of a user on the basis of a first position 2210 which is configured as a default in a process of initially manufacturing the wearable device. Or, after providing a display screen in the first position 2210, the wearable device may change a position of an image according to a response of a pupil while automatically changing the position of the image via an eye tracking sensor. In this case, as technologies are developing, a pupil and the like are sensed by the eye tracking sensor or a sight information sensor to obtain sight information of a user. By doing so, the wearable device may change a position on which an image is focused with a second position 2220, a third position 2230, or the like based on the sight information of the user. In the former case, in case that the wearable device changes the position of the image, if a user screws eyes up, the wearable device recognizes it as an intention of the user to see the image more closely since the image is focused too far compared to the sight of the user and then changes the position of the image to be closer to the user. On the contrary, if the eyes of the user become big all at once, the wearable device recognizes it as the image is too closely focused and may be then able to change the position of the image to be far from the user.

FIG. 23 illustrates a diagram for explaining a method of controlling a display screen according to such as a user action depicted in FIG. 21.

For instance, in case that a user selects a display window via an action and then moves the display window to external of a display area, the display screen can be controlled in consideration of a direction of the action.

Referring to FIG. 23 (a) and FIG. 23 (b), if the user performs an action of selecting the display window and then moving the display window to the top of a screen, it may mean to delete a corresponding content. If the user performs an action of moving the display window to a left or a right side, a next or a previous content can be outputted in the display window according to a content type attribute of a corresponding screen. If the user performs an action of moving the display window to the bottom of the screen, it may mean to store a corresponding content. In this case, instead of immediately executing a predetermined control for the aforementioned action of the user, the control may be implemented to be executed according to a selection of the user after a related confirmation window is provided.

Figure 24:
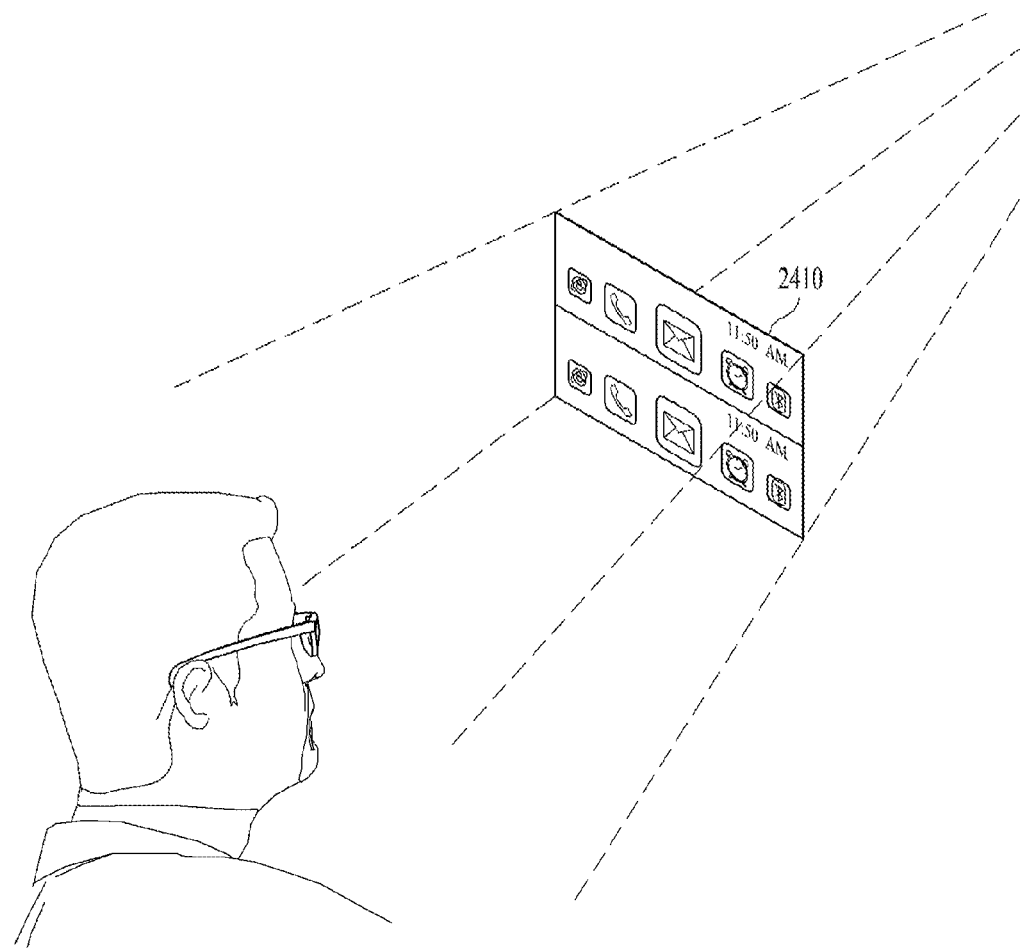
Figure 25:
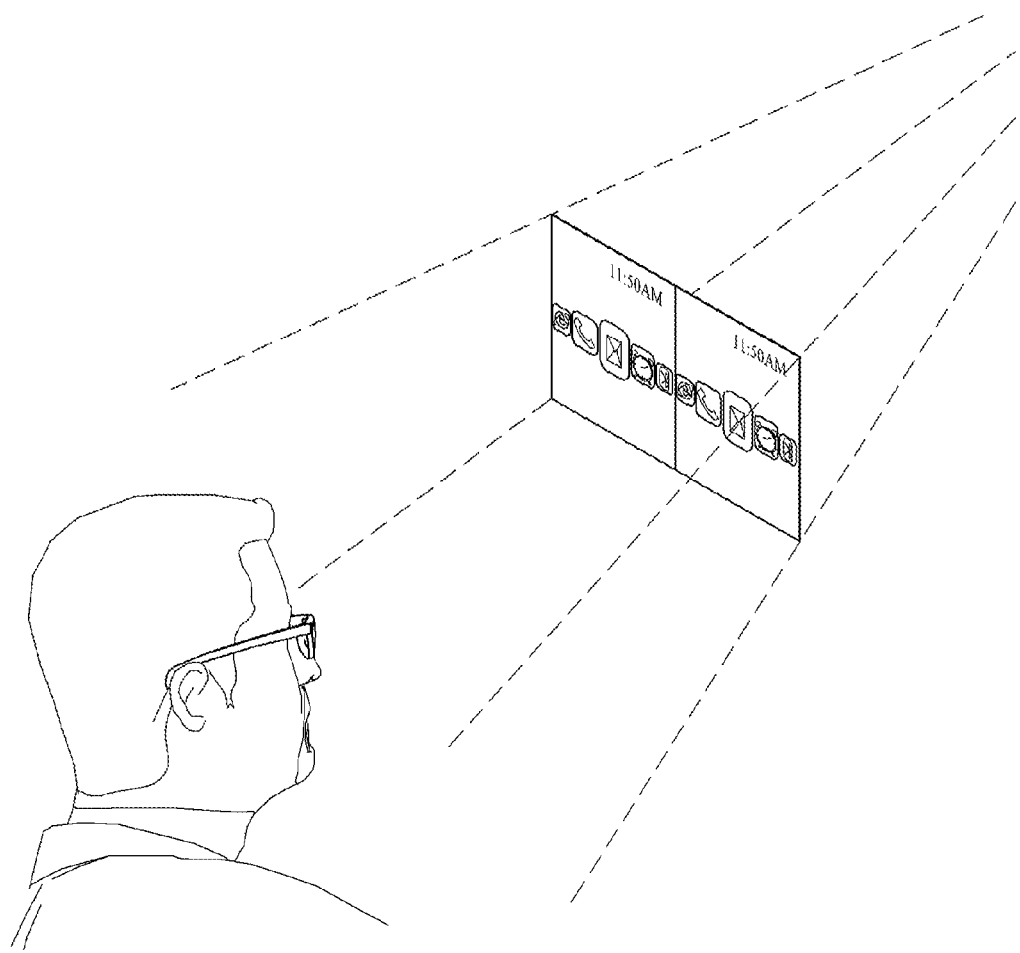
Figure 26:
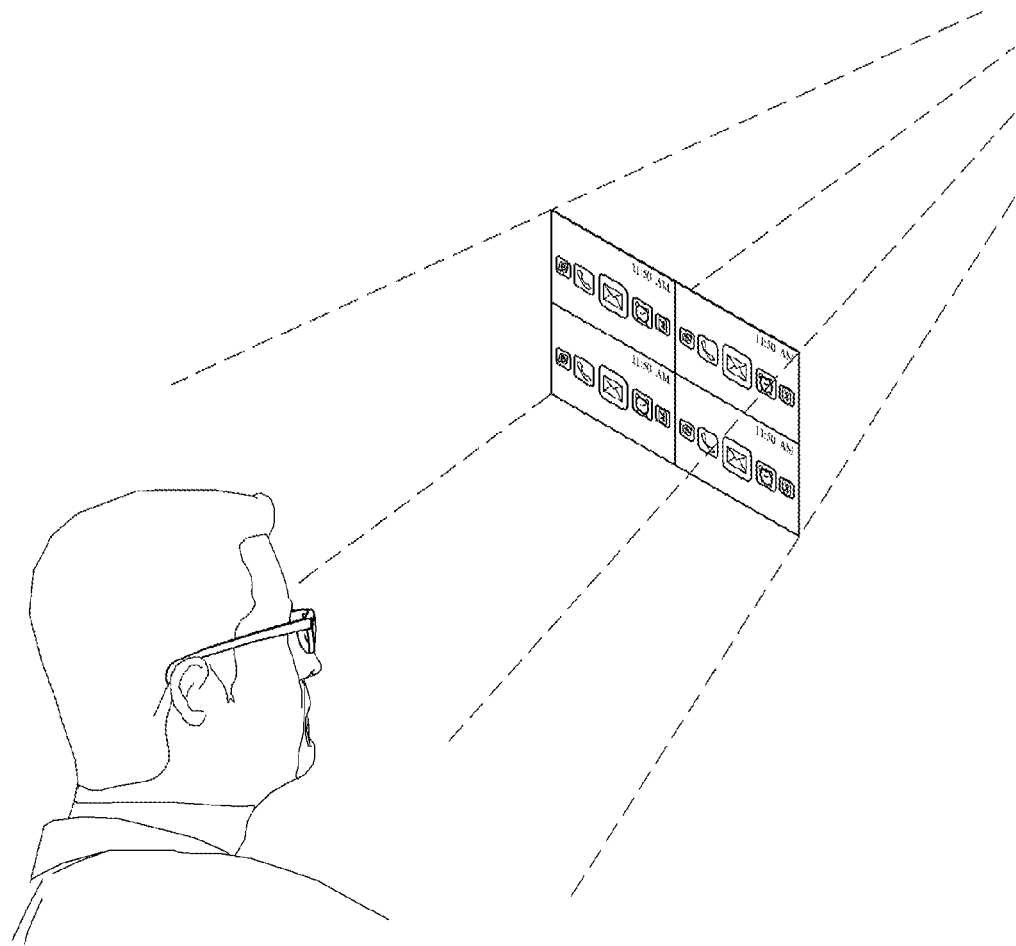

FIG. 24 to FIG. 26 illustrates a diagram for explaining a method of controlling a display screen configuration in the wearable device.

FIG. 24 is an example of partitioning a screen into two in top and bottom according to a selection or an action of a user from the screen used to be provided to the user in a manner that one window is activated only in an initial screen area in the wearable device. FIG. 25 is an example of partitioning a screen into two in left and right and FIG. 26 is an example of partitioning a screen into four.

The wearable device divides a screen according to a request of a user. Each of the divided screens provides contents different from each other. Or, one divided screen may output a previously provided content and another divided screen may output a user interface, detail information, related information, and the like for the corresponding content. In the latter case, a tool for the screen can be outputted together.

Meanwhile, as depicted in FIG. 26, in case of providing a screen in a manner of partitioning the screen into four, the wearable device can outputs contents different from each other in each of the screens. This can be identically applied to FIG. 24 and FIG. 25 as well. The contents outputted in each of the screens can variously consist of a video, a document, an image, an application, and the like including attributes and types different from each other. And, the wearable device may set priority ('top left' (top priority) to 'bottom right' (lowest priority) in each of the divided screens. Hence, unless the wearable device selects a 'bottom right' screen, which has a lowest priority, the 'bottom right' screen may output a tool necessary for the user to edit content of a specific area. Besides, if the specific area is selected, the tool may be provided randomly or according to the priority in an area adjacent to the selected specific area.

Figure 27:
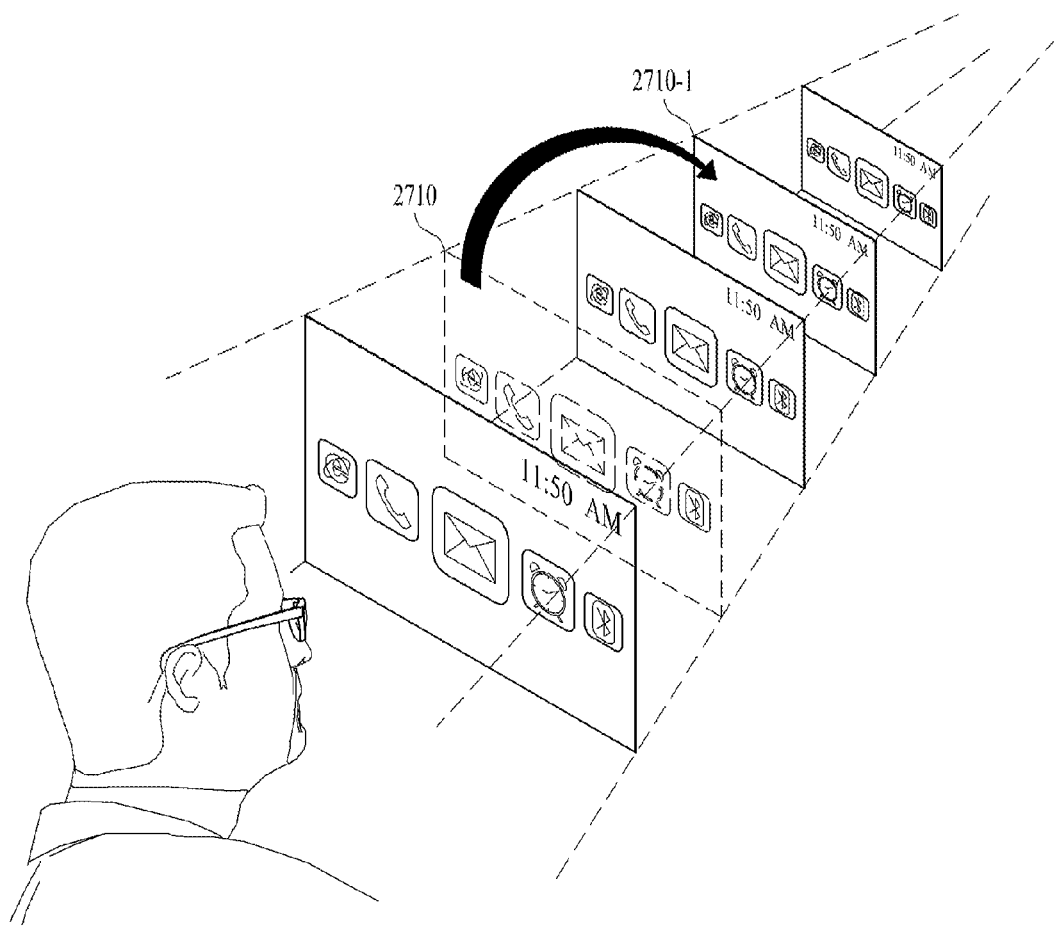

FIG. 27 illustrates a diagram for explaining a method of providing an application list, a schedule, application edit, and the like in the wearable device.

For instance, if a plurality of lists are necessary to be provided according to a list request of a user, the wearable device can output a plurality of the lists in a layer structure (hierarchical structure), a 3D form, or the like as depicted in the drawing. Meanwhile, in case of providing a plurality of the lists in the layer structure, for instance, each of the lists can be provided in a manner of being wrapped around according to a selection or an action of the user.

Meanwhile, the wearable device can change a layer 2710 in which each of the lists is provided based on a selection or an action of the user.

FIG. 28 is a diagram for explaining a method of implementing 2D/3D (2-dimensional/3-dimensional) in the wearable device.

As depicted in FIG. 24 or FIG. 25, the wearable device can provide a screen 2810 to a user in a manner of partitioning the screen into two.

In this case, the user outputs an identical content in each screen of the screen partitioned into two, i.e., the user outputs a left image and a right image. If each screen 2820 is gathered by top and bottom or left and right, 3D can be implemented from 2D. On the contrary, if one screen 2820 is split into top and bottom or left and right in a manner that a border of the one screen is held and split, the 3D can change to the 2D again. In the latter case, it may be able to automatically make either the left image or the right image to be remained (instead of partitioning the screen into two).

According to one embodiment of the present invention, a method of outputting content in a wearable device includes obtaining first sensing information, determining an output mode from any one of an active mode and a non-active mode according to a state of a user based on the first sensing information, and outputting content to a playback window on a screen according to the determined output mode, wherein if the output mode corresponds to the non-active mode, the content is configured to output in a first placback window corresponding to a whole screen, wherein if the output mode corresponds to the active mode, the content is configured to output in a part of the whole screen.

The content corresponds to one of pre-stored user interface data, video data, image data, text data, map data, application data, and message data which is received from an external device. The sensing information is obtained by at least one of a proximity sensor, a camera sensor, an audio sensor, an eye tracking sensor, and a motion sensor. The obtaining the first sensing information is periodically performed or is performed in case that a movement of the user is detected.

The method further comprises at least one of calculating an amount of incident light using an illumination sensor and obtaining location information of incident light source using an angle of reflection. And, the method further comprises generating and outputting at least one of a warning sound and a warning message based on at least one of the calculated amount of incident light and the obtained location information of the light source. Also, the method further comprises at least one of: changing configuration of the screen according to the determined output mode based on the at least one of the calculated amount of incident light and the obtained location information of the light source; and changing a color of content included in the screen based on the at least one of the calculated amount of incident light and the obtained location information of the light source. And, the method further comprises detecting a user action; obtaining second sensing information on the detected user action; and moving an image to be focused on a position of the screen based on the obtained second sensing information on the user action. Also, the method further comprises obtaining sight information of the user; and configuring and outputting to the screen to make an image to be focused on a position different from a predetermined position based on the obtained sight information of the user.

The wearable device described in the present disclosure can be provided in a manner of being implemented by various device forms. In particular, the wearable device can be implemented by such various device forms capable of providing a display in a manner of being worn on a user as an EMD, eyeglass, eyepiece, eye wear, HWD and the like as well as a HMD as a glasses-type device belonging to the wearable device. The wearable device may be non-limited to the terminologies explained in the present disclosure.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of outputting content by a head-mounted glasses-type wearable device, the method comprising:
   determining an output mode of the wearable device based on detected tracking information;

determining an amount of incident light on the wearable device;
determining location information of a source of the incident light based on an angle of reflection of the incident light; and
displaying the content on a screen of the wearable device according to the determined output mode, amount of incident light and location information,
wherein the content is displayed on an entire portion of the screen when the output mode is an active mode, and
wherein the content is displayed on less than the entire portion of the screen when the output mode is an inactive mode.

2. The method of claim 1, wherein the content corresponds to at least user interface data, video data, image data, text data, map data, application data, or message data.

3. The method of claim 1, wherein the tracking information is detected by at least a proximity sensor, a camera sensor, an audio sensor, an eye tracking sensor, a motion sensor, or an illumination sensor.

4. The method of claim 1, further comprising:
assigning a value corresponding to data detected by each of one or more sensors; and
changing a size or a style of the screen based on a comparison of each assigned value to a corresponding threshold value for each of the detected data.

5. The method of claim 1, further comprising outputting at least an audio alert or a message based on at least the determined amount of incident light or the determined location information.

6. The method of claim 5, further comprising changing a configuration of the screen or a color of the displayed content based on at least the determined amount of incident light or the determined location information.

7. The method of claim 1, further comprising:
changing a focal distance of the screen such that it is closer to a user in response to a user gesture detected in a first direction; and
changing the focal distance such that it is farther from the user in response to a user gesture detected in a second direction.

8. The method of claim 1, further comprising changing a focal distance of the screen based on eye tracking information of a user.

9. A wearable head-mounted glasses-type device, comprising:
at least one sensor configured to detect information;
a display configured to display information; and
a processor configured to:
determine an output mode of the wearable device based on tracking information detected by the at least one sensor;
determine an amount of incident light on the wearable device; and
determine location information of a source of the incident light based on an angle of reflection of the incident light; and
control the display to display content on a screen according to the determined output mode, amount of incident light and location information,
wherein the content is displayed on an entire portion of the screen when the output mode is an active mode, and
wherein the content is displayed on less than the entire portion of the screen when the output mode is an inactive mode.

10. The wearable device of claim 9, wherein the content corresponds to at least user interface data, video data, image data, text data, map data, application data, or message data.

11. The wearable device of claim 9, wherein
the tracking information is detected by at least a proximity sensor, a camera sensor, an audio sensor, an eye tracking sensor, a motion sensor, or an illumination sensor.

12. The wearable device of claim 9, wherein the processor is further configured to:
assign a value corresponding to the data detected by each of one or more of the at least one sensor; and
control the display to change a size or a style of the screen based on a comparison of each assigned value to a corresponding threshold value for each of the detected data.

13. The wearable device of claim 9, further comprising an audio device, wherein the processor is further configured control the audio device to output an audio alert or control the display to display a message based on at least the determined amount of incident light or the determined location information.

14. The wearable device of claim 13, wherein the processor is further configured to control the display to change a configuration of the screen or a color of the displayed content based on at least the determined amount of incident light or the determined location information.

15. The wearable device of claim 9, wherein the processor is configured to:
change a focal distance of the screen such that it is closer to a user in response to a user gesture detected in a first direction; and
change the focal distance such that it is farther from the user in response to a user gesture detected in a second direction.

16. The wearable device of claim 9, wherein the processor is further configured to change a focal distance of the screen based on eye tracking information of a user.

* * * * *